United States Patent
Osaka

(10) Patent No.: US 10,661,443 B2
(45) Date of Patent: May 26, 2020

(54) ROBOT APPARATUS, ROBOT CONTROLLING METHOD, PROGRAM AND RECORDING MEDIUM

(71) Applicant: CANON KABUSHIKI KAISHA, Tokyo (JP)

(72) Inventor: Tsutomu Osaka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 15/873,848

(22) Filed: Jan. 17, 2018

(65) Prior Publication Data

US 2018/0141218 A1    May 24, 2018

Related U.S. Application Data

(62) Division of application No. 15/333,751, filed on Oct. 25, 2016, now Pat. No. 9,902,073, which is a division
(Continued)

(30) Foreign Application Priority Data

Dec. 13, 2013 (JP) ............................... 2013-257609

(51) Int. Cl.
  *B25J 13/00* (2006.01)
  *B25J 13/08* (2006.01)

(52) U.S. Cl.
  CPC ... *B25J 13/088* (2013.01); *G05B 2219/40018* (2013.01); *Y10S 901/28* (2013.01); *Y10S 901/30* (2013.01)

(58) Field of Classification Search
  USPC ................................................ 700/245–264
  See application file for complete search history.

(56) References Cited

U.S. PATENT DOCUMENTS 4,977,971 A * 12/1990 Crane, III .................. B25J 5/00
                                                       180/8.3
5,056,038 A * 10/1991 Kuno ..................... B25J 9/1633
                                                       700/260
(Continued)

FOREIGN PATENT DOCUMENTS

DE          3689116          2/1994
DE         69608409          9/2000
(Continued)

OTHER PUBLICATIONS

Japanese Office Action dated Nov. 17, 2015 during prosecution of related Japanese application No. 2014-249690. (Cited During Prosecution of Parent U.S. Appl. No. 15/333,751.).
(Continued)

*Primary Examiner* — Jonathan L Sample
(74) *Attorney, Agent, or Firm* — Venable LLP

(57) ABSTRACT

A joint driving unit driving a joint of a robot arm includes a motor, a speed reducer transmitting rotation of the motor in a variable speed, an input side encoder detecting a rotation angle of a rotation shaft of the motor, and an output side encoder detecting a rotation angle of an output shaft of the speed reducer. When positioning the end effector at a working start position at which predetermined work is started, operation of the robot is set to an output based control mode in which an angle of a joint is feedback controlled based on an angle detection value from the output side encoder. When the robot performs the predetermined work, the operation of the robot is changed to an input based control mode in which the angle of the joint is feedback controlled based on an angle detection value from the input side encoder.

19 Claims, 17 Drawing Sheets

Related U.S. Application Data of application No. 14/561,771, filed on Dec. 5, 2014, now Pat. No. 9,505,133.

(56) References Cited

U.S. PATENT DOCUMENTS

| | | | | |
|---|---|---|---|---|
| 5,155,423 A | * | 10/1992 | Karlen | B25J 9/04 318/568.1 |
| 5,353,386 A | * | 10/1994 | Kasagami | B25J 9/1682 700/247 |
| 5,737,500 A | * | 4/1998 | Seraji | B25J 9/1643 318/568.11 |
| 5,784,542 A | * | 7/1998 | Ohm | B25J 3/04 700/247 |
| 6,364,888 B1 | * | 4/2002 | Niemeyer | H04N 13/327 606/130 |
| 6,424,885 B1 | * | 7/2002 | Niemeyer | A61B 34/70 600/109 |
| 6,519,860 B1 | * | 2/2003 | Bieg | B23H 7/26 33/1 PT |
| 6,766,204 B2 | * | 7/2004 | Niemeyer | H04N 13/327 700/1 |
| 6,853,879 B2 | * | 2/2005 | Sunaoshi | B25J 9/1689 318/568.11 |
| 8,482,242 B2 | | 7/2013 | Nakasugi | |
| 9,119,655 B2 | * | 9/2015 | Bowling | A61B 34/20 |
| 9,505,133 B2 | * | 11/2016 | Osaka | B25J 13/088 |
| 2001/0020199 A1 | * | 9/2001 | Bacchi | B25J 9/042 700/245 |
| 2002/0120361 A1 | * | 8/2002 | Kuroki | G05B 19/00 700/245 |
| 2003/0033024 A1 | * | 2/2003 | Sunaoshi | B25J 9/1689 700/3 |
| 2004/0254680 A1 | * | 12/2004 | Sunaoshi | A61B 34/70 700/253 |
| 2006/0241414 A1 | * | 10/2006 | Nowlin | A61B 34/70 600/431 |
| 2007/0010913 A1 | * | 1/2007 | Miyamoto | B25J 9/1658 700/264 |
| 2008/0109115 A1 | * | 5/2008 | Lim | B62D 57/032 700/258 |
| 2008/0114494 A1 | * | 5/2008 | Nixon | B25J 9/1692 700/254 |
| 2008/0132913 A1 | * | 6/2008 | Brock | A61B 17/0469 606/130 |
| 2008/0154246 A1 | * | 6/2008 | Nowlin | B25J 9/1689 606/1 |
| 2008/0235970 A1 | * | 10/2008 | Crampton | B25J 13/088 33/503 |
| 2009/0000136 A1 | * | 1/2009 | Crampton | B25J 13/088 33/503 |
| 2009/0088774 A1 | * | 4/2009 | Swarup | A61B 34/37 606/130 |
| 2010/0079099 A1 | * | 4/2010 | Katsuki | G05B 23/0256 318/565 |
| 2010/0191374 A1 | * | 7/2010 | Tsai | G05B 19/404 700/258 |
| 2010/0300230 A1 | * | 12/2010 | Helmer | B25J 9/106 74/469 |
| 2011/0029133 A1 | * | 2/2011 | Okazaki | A61G 7/1017 700/258 |
| 2011/0071675 A1 | * | 3/2011 | Wells | G06K 9/3216 700/250 |
| 2011/0118748 A1 | * | 5/2011 | Itkowitz | A61B 34/30 606/130 |
| 2012/0061155 A1 | * | 3/2012 | Berger | B25J 5/007 180/21 |
| 2013/0151009 A1 | * | 6/2013 | Okazaki | B25J 13/085 700/260 |
| 2013/0245829 A1 | * | 9/2013 | Ohta | B25J 9/1633 700/261 |
| 2014/0067124 A1 | * | 3/2014 | Williamson | G05B 19/406 700/258 |
| 2014/0081461 A1 | * | 3/2014 | Williamson | B25J 9/1643 700/261 |
| 2014/0084840 A1 | | 3/2014 | Osaka | |
| 2014/0379128 A1 | | 12/2014 | Ishikawa | |
| 2015/0165620 A1 | * | 6/2015 | Osaka | B25J 13/088 700/250 |
| 2015/0224639 A1 | * | 8/2015 | Dockter | B25J 3/04 700/264 |

FOREIGN PATENT DOCUMENTS

| | | |
|---|---|---|
| DE | 10236078 | 2/2004 |
| DE | 102005014651 | 10/2006 |
| EP | 1 139 561 | 10/2001 |
| EP | 1 652 595 | 5/2006 |
| JP | H06-19002 | 3/1994 |
| JP | 2002-219675 | 8/2002 |
| JP | 2005-028532 | 2/2005 |
| JP | 2011-115877 | 6/2011 |
| JP | 2011-123716 | 6/2011 |
| JP | 2011-176913 | 9/2011 |
| JP | 2013-240876 | 12/2013 |

OTHER PUBLICATIONS

German Office Action issued during prosecution of related German application No. 10 2014 225 537.6. (Cited During Prosecution of Parent U.S. Appl. No. 15/333,751.).

* cited by examiner

ROBOT APPARATUS, ROBOT CONTROLLING METHOD, PROGRAM AND RECORDING MEDIUM

This application is a divisional of application Ser. No. 15/333,751, filed Oct. 25, 2016, which is a divisional of application Ser. No. 14/561,771, filed Dec. 5, 2014 (now U.S. Pat. No. 9,505,133, issued on Nov. 29, 2016), which claims priority under 35 U.S.C. § 119 to Japan2013-257609, filed on Dec. 13, 2013, the contents of each of which are incorporated by reference.

BACKGROUND OF THE INVENTION

Field of the Invention

The present invention relates to a robot apparatus, a robot controlling method, a program and a recording medium that control driving of a joint of a robot arm.

Description of the Related Art

In production lines for manufacturing products, robots each including a multi-joint robot arm and an end effector provided at a distal end of the robot arm are used. Each joint mechanism in the robot arm include a servo motor such as an AC servo motor or a DC brushless servo motor and a speed reducer on the output side of the servo motor in order to obtain a high-output torque, and is connected to structural members such as links. Then, an angle is detected by a rotary encoder (hereinafter referred to as "encoder") directly connected to a rotation shaft of the motor, and based on a result of the detection, a position of the distal end of the robot arm (hand of the robot) is controlled. The encoder detects neither contortion nor backlash of the speed reducer connected to the motor, which may cause an error in position of the distal end of the robot arm. Also, variation in position and orientation of the robot arm or mass of workpieces may cause an error in position of the distal end of the robot arm. Furthermore, for the driving system, a timing belt or a wave speed reducer is often used, and therefore, contortion and/or backlash exist, which contributes to the error in position of the distal end of the robot arm.

On the other hand, in work for, e.g. insertion of parts, some margin of error is allowed because of the low rigidity of the driving system and the existence of backlash. For example, a case where a robot is made to operate so as to grasp a first workpiece via a robot hand, which serves as an end effector, and insert the first workpiece to a second workpiece will be considered. In this case, even if a distal end of the robot arm is somewhat misaligned, a position of the distal end of the robot arm is moved by the joint contortion and/or the backlash of the robot arm, enabling the first workpiece to be inserted along the second workpiece. In other words, the robot arm has an amount of mechanical compliance. Therefore, predetermined mechanical compliance is ensured in commonly-used robot arms, which are controlled by encoders of the rotation shafts of the motors.

In order to reduce the aforementioned error in position of the distal end of the robot arm, providing an encoder at an output shaft of the speed reducer has been proposed. Also, a robot including an encoder at each of an input shaft and an output shaft of a speed reducer, which provides both a high-accuracy mode using information from the encoder at the output shaft and a high-speed mode not using such information, has been proposed (see Japanese Patent Application Laid-Open No. 2011-176913).

However, a robot arm with an encoder provided at an output shaft of each speed reducer such as described above performs feedback control to feed back a value from an encoder at the output shaft of each joint as an instruction value for the joint. Thus, the robot arm has no or extremely small amount of mechanical compliance and no mechanical compliance of the robot arm can be expected. Accordingly, if there is an error in position between a workpiece to be mounted and a workpiece that is to receive that workpiece, difficulty in assembly work has resulted.

Therefore, an object of the present invention is to provide a robot apparatus, a robot controlling method, a program and a recording medium that, when positioning an end effector at a working start position, enhance an accuracy in operation of a robot arm, and during work, ensure mechanical compliance of the robot arm.

SUMMARY OF THE INVENTION

According to an aspect of the present invention, a robot apparatus comprises: a robot having a robot arm of multi-joint and an end effector attached to an end of the robot arm; and a control unit configured to control an operation of the robot, wherein the robot arm has a joint driving unit configured to drive the joint, the joint driving unit has a rotating motor, a speed reducer transmitting a rotation of the rotating motor in a variable speed, an input angle detecting unit detecting a rotation angle of a rotation axis of the rotating motor or an input axis of the speed reducer, and an output angle detecting unit detecting a rotation angle of an output axis of the speed reducer, and the control unit controls the operation of the robot, to set to an output based control mode such that an angle of the joint is feed-back controlled based on an angle detection value of the output angle detecting unit when the end effector is to be aligned with a working start position at which the robot starts a predetermined working, and to change to an input based control mode such that the angle of the joint is feed-back controlled based on an angle detection value of the input angle detecting unit when the operation of the robot is controlled to perform the predetermined working.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment (1) Description of Robot Apparatus Configuration

Figure 1:
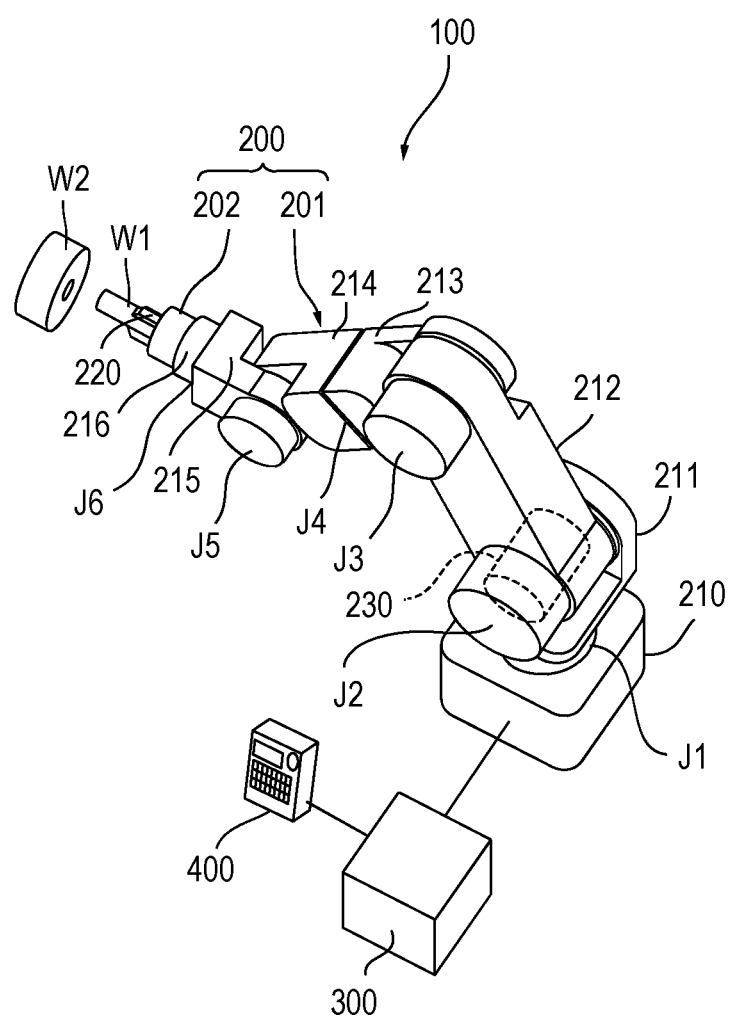
FIG. 1 is a perspective view illustrating a robot apparatus according to a first embodiment.

FIG. 1 is a perspective view illustrating a robot apparatus according to a first embodiment of the present invention. A robot apparatus 100 includes a robot 200, a controller 300, which serves as a controlling unit that controls operation of the robot 200, and a teaching pendant 400, which serves as a teaching unit to be operated by a user to teach the operation of the robot 200.

The robot 200 includes a multiaxial, vertical multi-joint robot arm 201 and a robot hand 202, which serves as an end effector attached to a distal end of the robot arm 201.

The robot arm 201 includes a base portion 210 fixed to a work station and a plurality of links 211 to 216 that transmit displacement and/or force, the plurality of links 211 to 216 being bendably or rotatably joined to one another via joints J1 to J6. In the first embodiment, the robot arm 201 includes the six joints J1 to J6, which are three bendable joints and three rotatable joints. Here, "bendable" means bending at a certain point in a part of connection between two links, and "rotatable" means relative rotation of two links via respective rotation shafts in a longitudinal direction of the links, and the bendable joints and the rotatable joints are referred to as "bending portions" and "rotating portions", respectively. The robot arm 201 includes six joints J1 to J6, and each of the joints J1, J4 and J6 is a rotating portion and each of the joints J2, J3 and J5 is a bending portion.

The robot hand 202 is an end effector that is coupled to the sixth link (distal end link) 216 and performs work for mounting a workpiece W1, which is a first workpiece, and includes a plurality of fingers 220. The fingers 220 can grasp the workpiece W1 by making the fingers 220 close, and can release the workpiece W1 by making the fingers 220 open. A workpiece W2 is a second workpiece, and the present embodiment will be described in terms of an example in which the workpiece W1 is inserted to the workpiece W2.

The robot arm 201 includes a plurality of (six) joint driving units 230 provided for the respective joints J1 to J6 to drive the respective joints J1 to J6. In FIG. 1, for the sake of simplicity, only the joint driving unit 230 for the joint J2 is illustrated and illustration of the other joints J1 and J3 to J6 is omitted; however, a joint driving unit 230 having a configuration similar to that of the joint driving unit 230 for the joint J2 is also disposed at each of the other joints J1 and J3 to J6. Here, the first embodiment will be described in terms of a case where each of the joints J1 to J6 is configured to be driven by a joint driving unit 230, it is only necessary that at least one of the joints J1 to J6 is configured to be driven by a joint driving unit 230.

The joint driving unit 230 at the joint J2 will be described below as a typical example, and description of the joint driving units 230 at the other joints J1 and J3 to J6 will be omitted because such joint driving units 230 have a configuration similar to that of the joint driving unit 230 at the joint J2 although such joint driving units 230 may be different in size and/or performance from the same.

(2) Description of Configuration of Joint Driving Unit 230 at Joint J2

Figure 2:
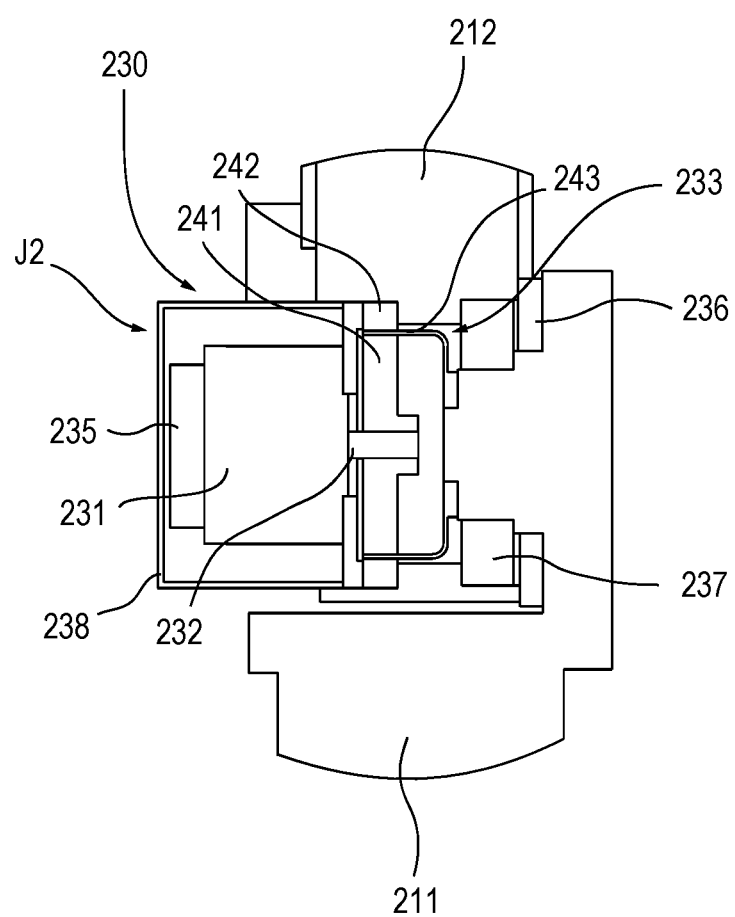
FIG. 2 is a partial cross-sectional view illustrating a joint of a robot arm.

FIG. 2 is a partial cross-sectional diagram illustrating a joint J2 of the robot arm 201. The joint driving unit 230 includes a rotating motor (hereinafter referred to as "motor") 231, which is an electromagnetic motor, and a speed reducer 233 that transmits rotation of a rotation shaft 232 of the motor 231 in a variable speed.

The joint driving unit 230 also includes an input side encoder 235, which is an input angle detecting unit that detects a rotation angle of either of the rotation shaft 232 of the motor 231 and an input shaft of the speed reducer 233, in the first embodiment, the rotation shaft 232 of the motor 231. Also, the joint driving unit 230 includes an output side encoder 236, which is an output angle detecting unit that detects a rotation angle of an output shaft of the speed reducer 233. Although not illustrated in FIG. 2, the joint driving unit 230 includes a motor driving apparatus, which will be described later.

The rotating motor 231 is a servo motor, for example, a brushless DC servo motor or an AC servo motor.

The input side encoder 235 desirably is an absolute rotary encoder, and includes a single-turn absolute angle encoder, a counter for a total number of turns of the absolute angle encoder and a backup battery that supplies power to the counter. Even though the power supply to the robot arm 201 is turned off, if the backup battery is effective, the total number of turns is kept in the counter regardless of whether the power supply to the robot arm 201 is on or off. Therefore, the position and orientation of the robot arm 201 can be controlled. Here, although the input side encoder 235 is attached to the rotation shaft 232, the input side encoder 235 may be attached to the input shaft of the speed reducer 233.

The output side encoder 236 is a rotary encoder that detects a relative angle between the base portion 210 and the link 211 or two adjacent links. In the joint J2, the output side encoder 236 is a rotary encoder that detects a relative angle between the link 211 and the link 212. The output side encoder 236 has a configuration in which an encoder scale is provided on the link 211 and a detection head is provided on the link 212 or a configuration that is opposite to such configuration.

Also, the link 211 and the link 212 are rotatably coupled via a cross roller bearing 237.

The motor 231 is covered and thereby protected by a motor cover 238. A non-illustrated brake unit is provided between the motor 231 and the encoder 235. The brake unit holds the position and orientation of the robot arm 201 when the power is off as a main function thereof.

In the first embodiment, the speed reducer 233 is a wave gearing reducer that is small and light and has a large gear reduction ratio. The speed reducer 233 includes a wave generator 241, which is attached to the input shaft, connected to the rotation shaft 232 of the motor 231, and a circular spline 242, which is attached to the output shaft, fixed to the link 212. Here, the circular spline 242 is directly joined to the link 212, but may be formed integrally with the link 212.

Also, the speed reducer 233 includes a flex spline 243 that is disposed between the wave generator 241 and the circular spline 242 and is fixed to the link 211. The flex spline 243, rotation of which is transmitted at a speed reducer ratio N relative to rotation of the wave generator 241, rotates relative to the circular spline 242. Therefore, rotation of the rotation shaft 232 of the motor 231 is transmitted at a speed reducer ratio of 1/N by the speed reducer 233, and makes the link 212 with the circular spline 242 fixed thereto rotate relative to the link 211 with the flex spline 243 fixed thereto, whereby the joint J2 bends.

(3) Description of Configuration of Controller 300

Figure 3:
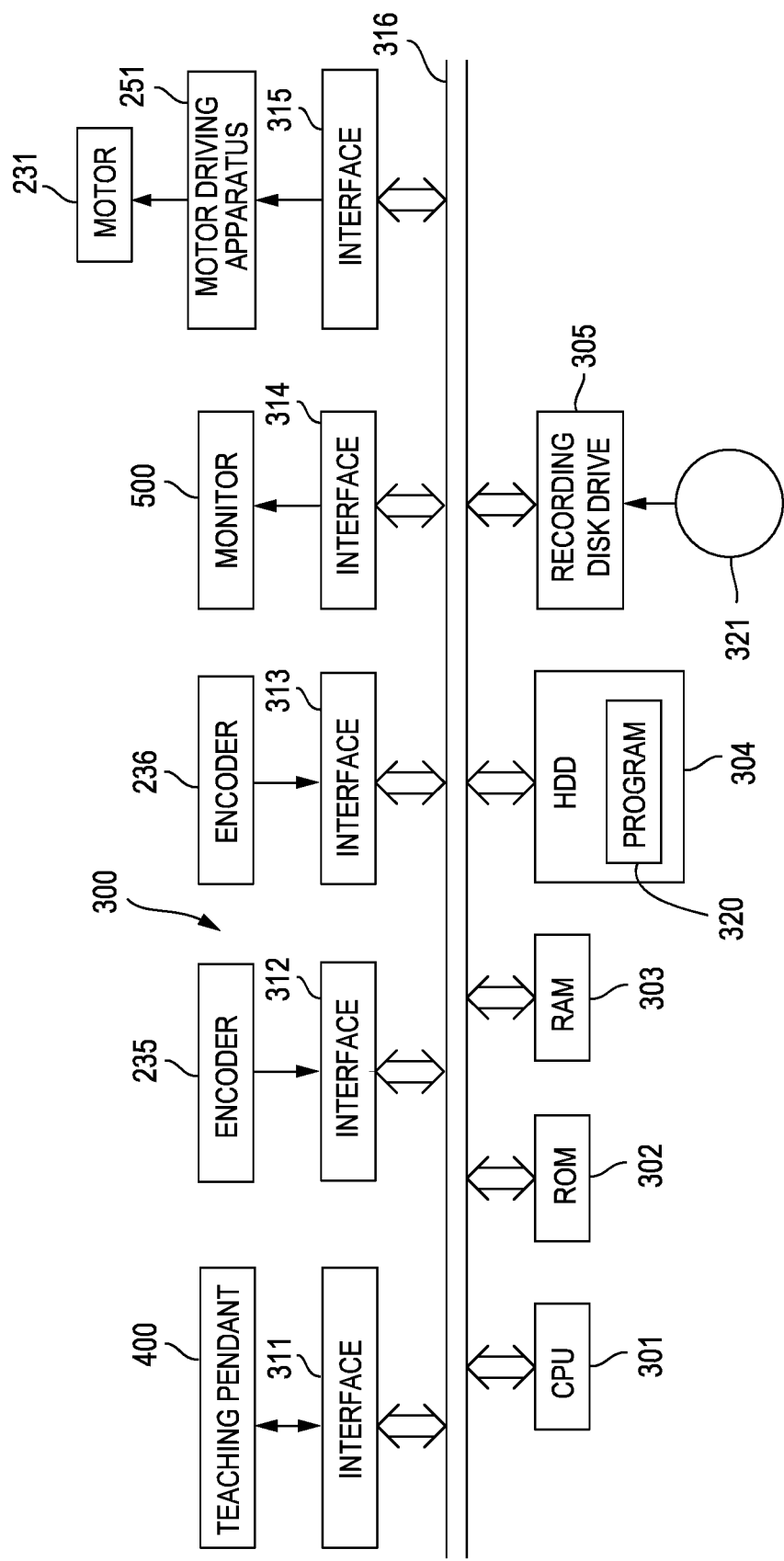
FIG. 3 is a block diagram illustrating a configuration of a controller in a robot apparatus according to the first embodiment.

FIG. 3 is a block diagram illustrating a configuration of the controller 300 in the robot apparatus 100. The controller 300 includes a CPU (central processing unit) 301, which serves as a controlling unit (arithmetic operation unit). The controller 300 also include a ROM (read-only memory) 302, a RAM (random access memory) 303 and an HDD (hard disk drive) 304 as storage units. Also, the controller 300 includes a recording disk drive 305 and various interfaces 311 to 315.

The ROM 302, the RAM 303, the HDD 304, the recording disk drive 305 and various interfaces 311 to 315 are connected to the CPU 301 via a bus 316. A basic program such as BIOS is stored in the ROM 302. The RAM 303 is a storage device that temporarily stores various data such as results of arithmetic operation processing by the CPU 301.

The HDD 304 is a storage device that stores, e.g., the results of arithmetic operation processing by the CPU 301 and various data obtained externally, and records a program 320 for making the CPU 301 perform various arithmetic operation processing. The CPU 301 performs respective steps of a robot controlling method based on the program 320 recorded (stored) in the HDD 304.

The recording disk drive 305 can read, e.g., various data and/or programs recorded on a recording disk 321.

The teaching pendant 400, which is a teaching unit, is connected to the interface 311. The teaching pendant 400 designates teaching points for teaching the robot 200, that is, target joint angles (angle instruction values) of the respective joints J1 to J6 in response to an input by a user. The teaching point data (teaching data) is output to the CPU 301 or the HDD 304 through the interface 311 and the bus 316. The CPU 301 receives an input of the teaching data from the teaching pendant 400 or the HDD 304.

The input side encoder 235 is connected to the interface 312, and the output side encoder 236 is connected to the interface 313. From each of the encoders 235 and 236, a pulse signal indicating a detected angle detection value is output. The CPU 301 receives inputs of the pulse signals from the encoders 235 and 236 via the interfaces 312 and 313 and the bus 316.

A display apparatus (monitor) 500, which is a display unit, is connected to the interface 314, and displays an image under the control of the CPU 301.

Each motor driving apparatus 251 is connected to the interface 315. The CPU 301, based on the teaching data, outputs data for a driving instruction indicating an amount of control of the rotation angle of the rotation shaft 232 of each motor 231 to the corresponding motor driving apparatus 251 via the bus 316 and the interface 315 at predetermined time intervals.

The motor driving apparatuses 251, based on the driving instruction inputs from the CPU 301, performs respective arithmetic operations to obtain respective amounts of current output to the respective motors 231 and supply current to the respective motors 231 to control the respective angles of the joints J1 to J6. The motor driving apparatuses 251 are provided for the respective joints J1 to J6, and for example, are disposed at the respective joints J1 to J6 although the illustration is omitted in FIG. 2. Then, each motor 231, upon receipt of power supply from the corresponding motor driving apparatus 251, generates driving torque and transmits the torque to the corresponding wave generator 241, which is attached to the input shaft of the corresponding speed reducer 233. In the speed reducer 233, the circular spline 242, which is attached to the output shaft, rotates relative to rotation of the wave generator 241 at a rotation frequency of 1/N. Consequently, the link 212 rotates relative to the link 211. In other words, the CPU 301 controls the driving of the joints J1 to J6 by the respective motors 231 via the respective motor driving apparatuses 251 so as to bring the joint angles of the joints J1 to J6 to the target joint angles.

Non-illustrated external storage devices such as rewritable non-volatile memories and/or external HDDs may be connected to the bus 316 via non-illustrated interfaces.

(4) Description of Functions of Controller 300 and Joint J2

Figure 4:
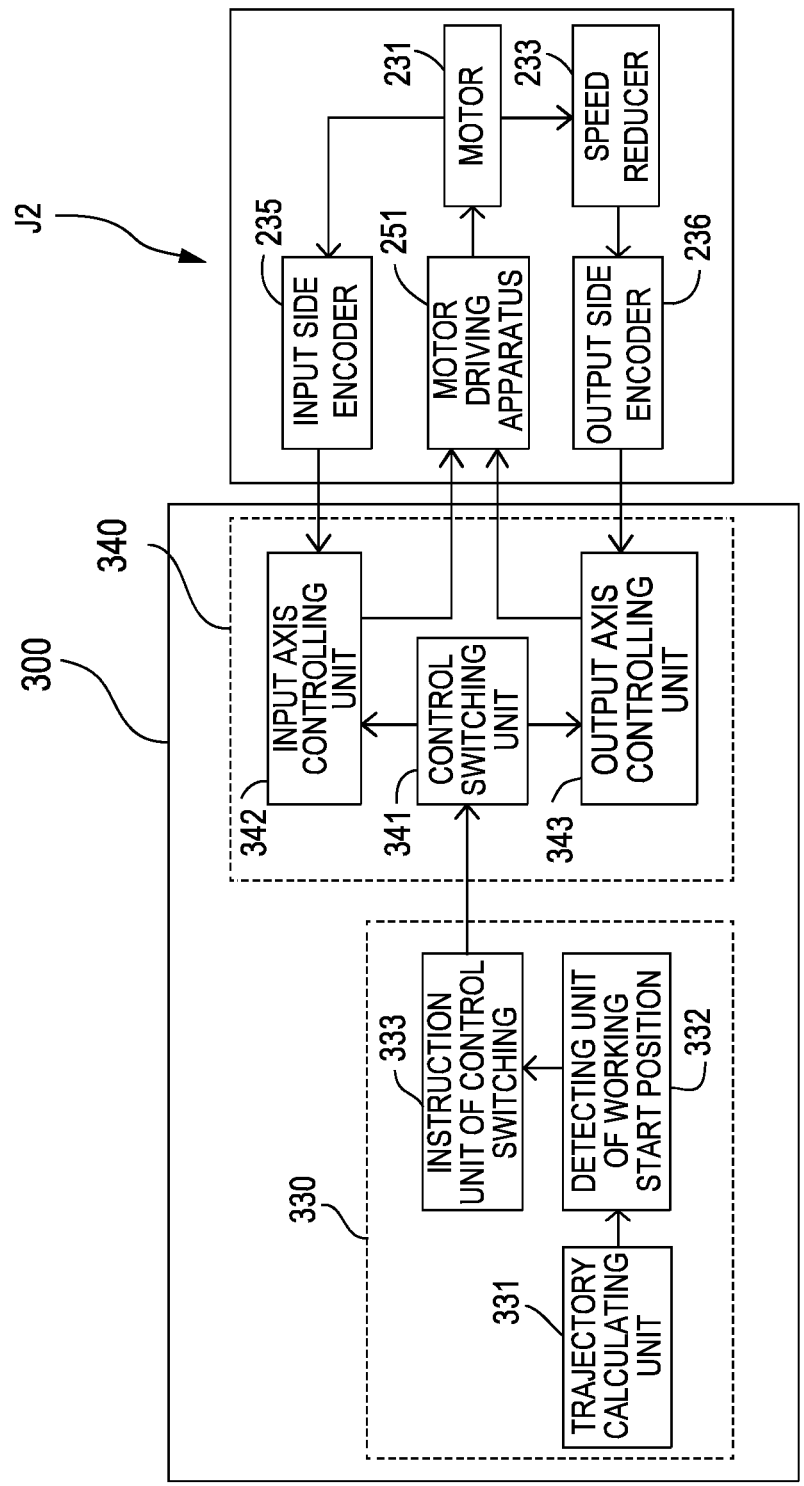
FIG. 4 is a function block diagram illustrating a configuration of a main part of the robot apparatus according to the first embodiment.

FIG. 4 is a function block diagram illustrating a configuration of a main part of the robot apparatus according to the first embodiment. In the controller 300, the functions of the CPU 301 based on the program 320 are illustrated in blocks, and in the robot 200, the joint J2 of the robot arm 201 is illustrated in blocks. The controller 300 has a function of a main controlling unit 330 and functions of joint controlling units 340 for the respective joints. FIG. 4 illustrates a joint controlling unit 340 for the joint J2 only; however, a plurality of joint controlling units 340 for the respective joints J1 and J3 to J6 is provided although not illustrated.

The main controlling unit 330 includes a trajectory calculating unit 331, a working start position detecting unit 332 and a control switching instruction unit 333. Each joint controlling unit 340 includes a control switching unit 341, an input shaft controlling unit 342 and an output shaft controlling unit 343.

First, a control operation of the main controlling unit 330 will be described. The trajectory calculating unit 331 calculates a motion (trajectory) of the robot arm 201 based on teaching data. The working start position detecting unit 332 detects (determines) whether or not the robot hand 202 attached to the distal end of the robot arm 201 reaches a working start position, using a result of the calculation by the trajectory calculating unit 331. The control switching instruction unit 333 generates a control switching instruction signal for switching between input shaft control performed by input shaft controlling unit 342 and output shaft control by the output shaft controlling unit 343, for the control switching unit 341 of the joint controlling unit 340 that controls driving of the relevant joint, in FIG. 4, the joint J2. More specifically, if the working start position detecting unit 332 determines that the robot hand 202 reaches the working start position, the control switching instruction unit 333 outputs an instruction for switching to the input shaft control to the control switching unit 341. For the working start position, a position at which the first workpiece W1 and the fingers 220 do not interfere with each other is set. For highly-accurate work, it is necessary to set the working start position at a position that is as close to the first workpiece W1 as possible. Thus, a distance between the workpiece W1 and the fingers 220 (robot hand) is calculated, and a positional accuracy of the workpiece W2, part accuracies, and a positional accuracy of fingers are taken into account in addition to the distance. The working start position is set so that the first workpiece W1 and the fingers 220 do not interfere with each other and the distance between the workpiece W1 and the fingers 220 is minimum. As described above, the working start position is obtained based on the distance between the workpiece and the robot hand, the accuracies of the workpieces and the accuracy of the robot. A margin may further be added in consideration of, e.g., an influence of disturbance on the robot. Also, if the working start position detecting unit 332 determines that the robot hand 202 does not reach the working start position, the control switching instruction unit 333 outputs an instruction for switching to the output shaft control to the control switching unit 341.

Next, the joint controlling units 340 will be described. Each control switching unit 341 determines whether to make the corresponding input shaft controlling unit 342 or the corresponding output shaft controlling unit 343 function, according to an instruction from the control switching instruction unit 333 in the main controlling unit 330. More specifically, if the control switching unit 341 receives an instruction for switching to the input shaft control, the control switching unit 341 makes the input shaft controlling unit 342 function, and if the control switching unit 341 receives an instruction for switching to the output shaft control, the control switching unit 341 makes the output shaft controlling unit 343 function.

The input shaft controlling unit 342 controls the relevant joint based on a value from the corresponding input side encoder 235. In other words, the input shaft controlling unit 342 performs position control with reference to angle information from the input side encoder 235. The output shaft controlling unit 343 controls the joint based on a value from the output side encoder 236. In other words, the output shaft controlling unit 343 performs position control with reference to angle information from the output side encoder 236.

In an output based control mode in which the output shaft controlling unit 343 performs control, the effects of the elasticity and backlash of the speed reducer 233 are cancelled, ensuring the distal end accuracy. On the other hand, in an input based control mode in which the input shaft controlling unit 342 performs control, the distal end accuracy is decreased by, e.g., the elasticity of the speed reducer 233. However, the mechanical compliance amount is large because of the elasticity of the speed reducer 233 compared to a case where the output shaft controlling unit 343 performs control, and thus, the mechanical compliance is large in part insertion.

(5) Description of Steps of Robot Controlling Method

Figure 5:
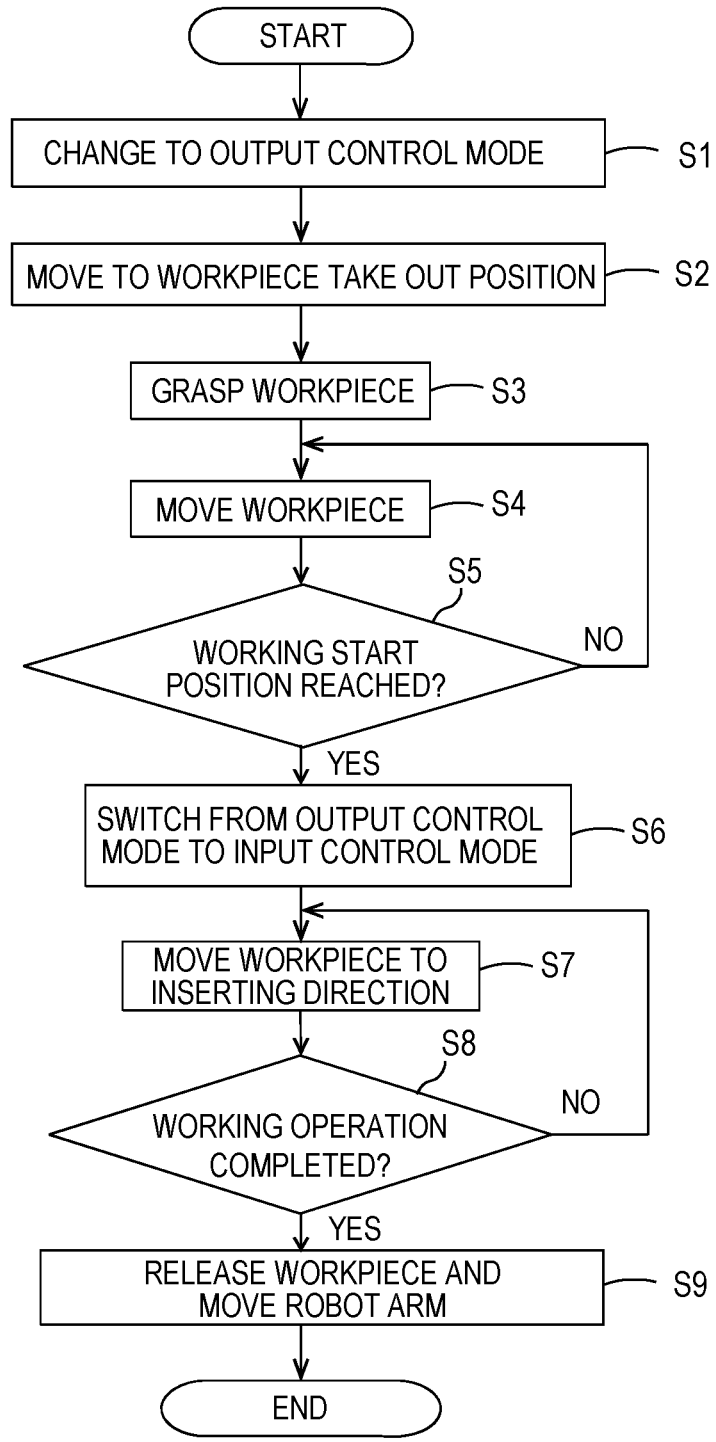
FIG. 5 is a flowchart illustrating a robot controlling method according to the first embodiment.

Next, a robot controlling method in which operation of the robot 200 is controlled by the CPU 301 will be described. FIG. 5 is a flowchart illustrating a robot controlling method according to the first embodiment. In the first embodiment, predetermined work to be performed by the robot 200 is insertion work for inserting a workpiece W1 to a workpiece W2, which is a second workpiece.

The CPU 301 changes the control of the robot arm 201 to the output based control mode (S1). The output based control mode is a control mode in which the angle of the joint J2 is feedback controlled based on an angle detection value from the output side encoder 236. In other words, the output based control mode is a control mode in which the rotation angle of the motor 231 is feedback controlled so that the angle detection value from the output side encoder 236 approaches a target value corresponding to a target joint angle. In the first embodiment, the output based control mode is set for each of the plurality of joint driving units 230 corresponding to the plurality of joints J1 to J6. In the output based control mode, the feedback control is performed using the angle detection value from the output side encoder 236 that detects the rotation angle of the output shaft of the speed reducer 233, enabling highly-accurate control to bring the angle of the joint J2 to the target joint angle without depending on elastic deformation of the speed reducer 233.

Next, the CPU 301 controls operation of the robot arm 201 so that the robot hand 202 moves to a position for grasping the workpiece W1 and taking the workpiece W1 out (workpiece take out position) (S2). In this case, the CPU 301 sets the control mode to the output based control mode, the robot hand 202 is positioned at the workpiece take out position with high accuracy.

Next, when the robot hand 202 has moved to the workpiece take out position, the CPU 301 controls the operation of the robot hand 202 so as to make the robot hand 202 grasp the workpiece W1 (S3).

Next, the CPU 301 controls the operation of the robot arm 201 so that the robot hand 202 is positioned at a working start position at which work for insertion of the workpiece W1 by the robot 200 is started (S4: output control step). In this case, since the CPU 301 has set the control mode to the output based control mode, the robot hand 202 can be positioned at the working start position with high accuracy. The working start position is set at a position in the vicinity of the workpiece W2.

Here, a purpose of the setting change to the output based control mode in step S2 is to ensure a positional accuracy of the robot hand 202 when the robot hand 202 moves to the working start position, and thus, if there are no restrictions on a route of the movement, the setting may be changed to the output based control mode at the working start position.

Next, the CPU 301 determines whether or not the robot hand 202 reaches the working start position (S5: determination step).

If the CPU 301 determines in step S5 that the robot hand 202 does not yet reach the working start position (S5: No), the CPU 301 returns to step S4, and controls the operation of the robot arm 201 in the output based control mode.

If the CPU 301 determines in step S5 that the robot hand 202 reaches the working start position (S5: Yes), the control of the robot arm 201 is switched from the output based control mode to the input based control mode (S6: input control step). The input based control mode is a control mode in which the angle of the joint J2 is feedback controlled based on an angle detection value from the input side encoder 235. In other words, the input based control mode is a control mode in which the rotation angle of the motor 231 is feedback controlled so that the angle detection value from the input side encoder 235 approaches a target value corresponding to a target joint angle. In the first embodiment, the setting may be changed to the input based control mode for at least one joint driving unit from among the plurality of joint driving units 230 for the joints J1 to J6; however, in the first embodiment, the setting is changed to the input based control mode for each of the joint driving units. As described above, if the robot 200 performs insertion work for inserting the workpiece W1 to the workpiece W2 after the robot hand 202 being positioned at the working start position, the setting is changed from the output based control mode to the input based control mode.

In the input based control mode, feedback control is performed based on the angle detection value from the input side encoder 235, and thus, a movement corresponding to an amount of elastic deformation of the speed reducer 233 is allowed for the angle of the joint, that is, the position of the robot hand 202. In other words, the CPU 301 enhances the mechanical compliance of the robot arm 201 by means of performing step S6. The enhancement of the mechanical compliance of the robot arm 201 enables enlargement of a range in which the workpiece W1 can be inserted to the workpiece W2.

The CPU 301 performs the operation of the robot arm 201 so that the robot arm 201 moves an insertion direction in which the robot hand 202 grasping the workpiece W1 inserts the workpiece W1 to the workpiece W2 (S7).

Next, the CPU 301 determines whether or not the insertion work is completed as the predetermined work (S8: workpiece work determination step). If the insertion work is not yet completed (S8: No), the CPU 301 returns to step S7 and continues the insertion work.

If the CPU 301 determines that the insertion work is completed (S8: Yes), the CPU 301 moves the fingers 220 of the robot hand 202 in respective directions in which the fingers 220 open (in other words, extends the robot hand 202) to release the workpiece W1. Then, the CPU 301 moves the robot arm 201 to a predetermined position and orientation (S9). Consequently, the present operation ends.

As described above, according to the first embodiment, when positioning the robot hand 202 at a working start position, the setting is made to provide the output based control mode, and thus, the accuracy in operation of the robot arm 201 is enhanced, enabling the robot hand 202 to be positioned at the working start position with high accuracy. Also, for insertion work, the setting is made to provide the input based control mode, mechanical compliance (flexibility) of the robot arm 201 is ensured, whereby the insertion work is smoothly performed by the robot 200 and workability in the insertion work is enhanced. Therefore, a decrease in user-friendliness can be avoided.

Here, the above-described workpiece work determination step can be performed in either control mode, i.e., the input based control mode or the output based control mode.

Second Embodiment

Next, a robot controlling method for a robot apparatus according to a second embodiment of the present invention will be described. In inserting a workpiece W1 to a workpiece W2, there are cases where the workpiece W1 is moved relative to the workpiece W2 by a predetermined distance to complete the insertion work and cases where the workpiece W1 is made to abut to an abutment surface of the workpiece W2 to complete the insertion work. The second embodiment will be described in terms of a case where a robot hand 202 is moved (that is, the workpiece W1 is moved relative to the workpiece W2) from a working start position by a predetermined distance in an insertion direction to complete the insertion work.

Figure 6A:
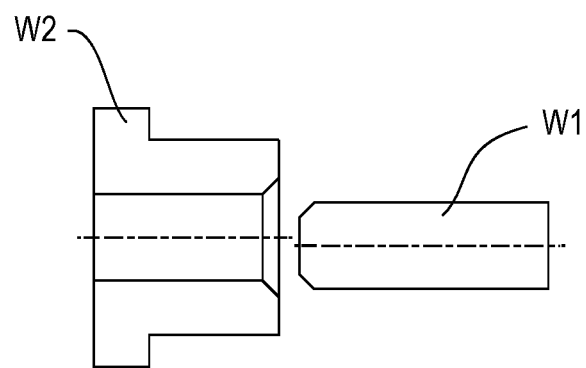
FIGS. 6A and 6B are diagrams illustrating states before and after insertion work for inserting a first workpiece to a second workpiece.
Figure 6B:
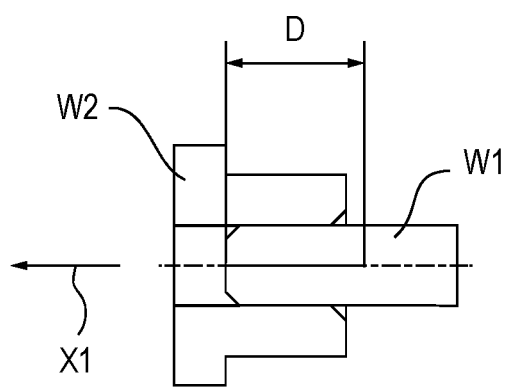

FIGS. 6A and 6B are diagrams illustrating states before and after insertion work for inserting a workpiece W1 to a workpiece W2. FIG. 6A illustrates a state before insertion work, and FIG. 6B illustrates a state after the insertion work. The workpiece W1 is a columnar member, and the workpiece W2 is a member with a through hole formed therein, the through hole allowing the workpiece W1 to be fitted therein. When the robot hand 202 moves to a working start position, the workpiece W1 grasped by the robot hand 202 moves to the position in FIG. 6A. As described in the first embodiment, switching to an input based control mode at a working start position enables insertion regardless of some axial misalignment. As a result of moving the robot hand 202 from the working start position by a predetermined distance D in the insertion direction, as illustrated in FIG. 6B, the workpiece W1 has been moved relative to the workpiece W2 by the predetermined distance D in the insertion direction (arrow X1 direction) and thereby the insertion work is completed.

Figure 7:
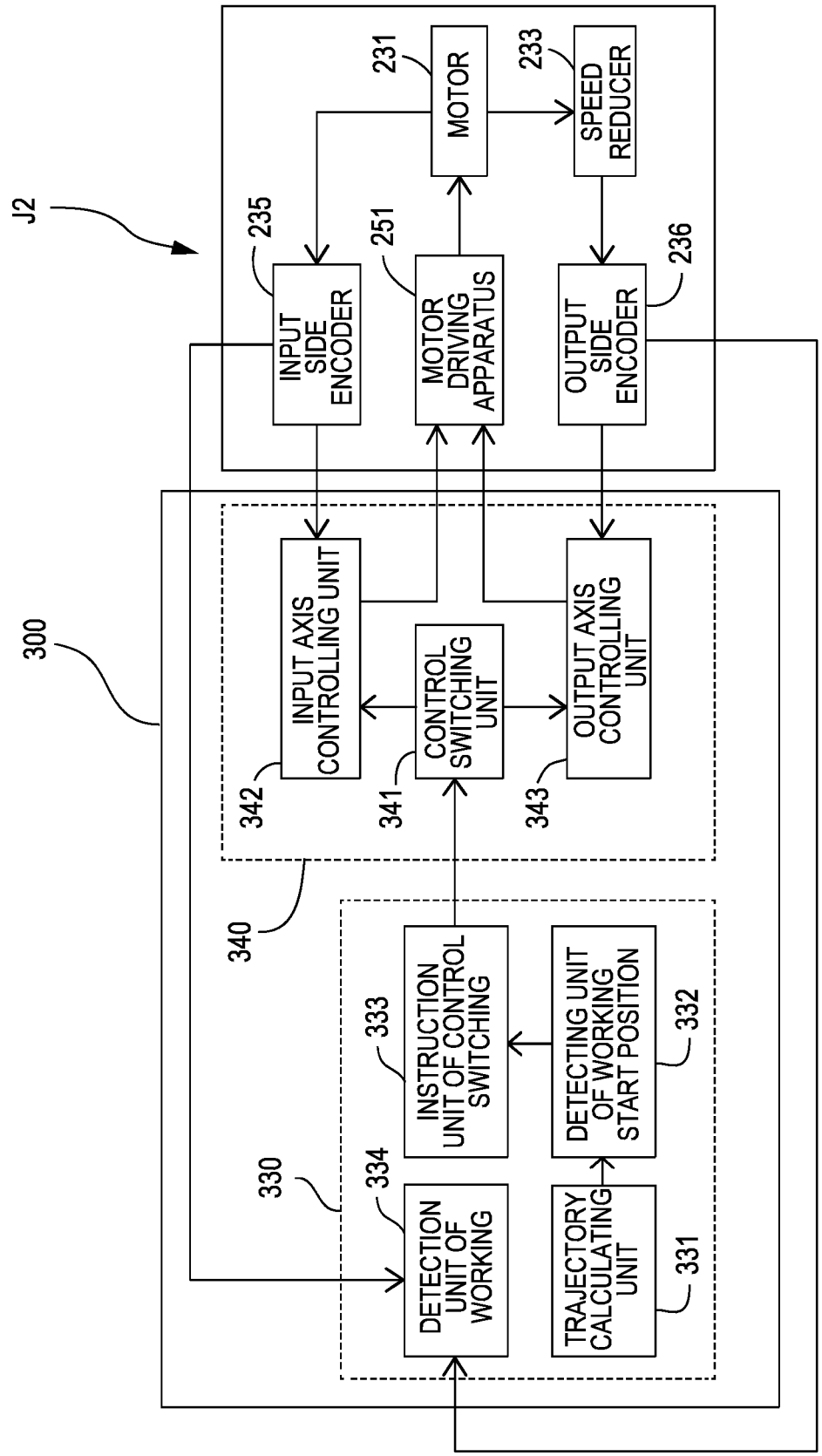
FIG. 7 is a function block diagram illustrating a configuration of a main part of a robot apparatus according to a second embodiment.

FIG. 7 is a function block diagram illustrating a configuration of a main part of a robot apparatus according to the second embodiment. The second embodiment is substantially similar to that of the first embodiment in apparatus configuration of the robot apparatus, but is different from the first embodiment in control operation of a CPU, which is a controlling unit, that is, a program that makes the CPU operate. Therefore, in the second embodiment, description of components and configurations that are similar to those of the first embodiment will be omitted, and differences from the first embodiments will be described. FIG. 7 illustrates a joint controlling unit 340 for a joint J2 only; however, a plurality of joint controlling units 340 for other joints J1 and J3 to J6 is provided although not illustrated.

A main controlling unit 330 includes a workpiece work determination unit 334 in addition to a trajectory calculating unit 331, a working start position detecting unit 332 and a control switching instruction unit 333.

The workpiece work determination unit 334 calculates a contortion angle of a joint from an angle detection value detected by an output side encoder 236 and an angle detection value detected by an input side encoder 235.

Figure 8:
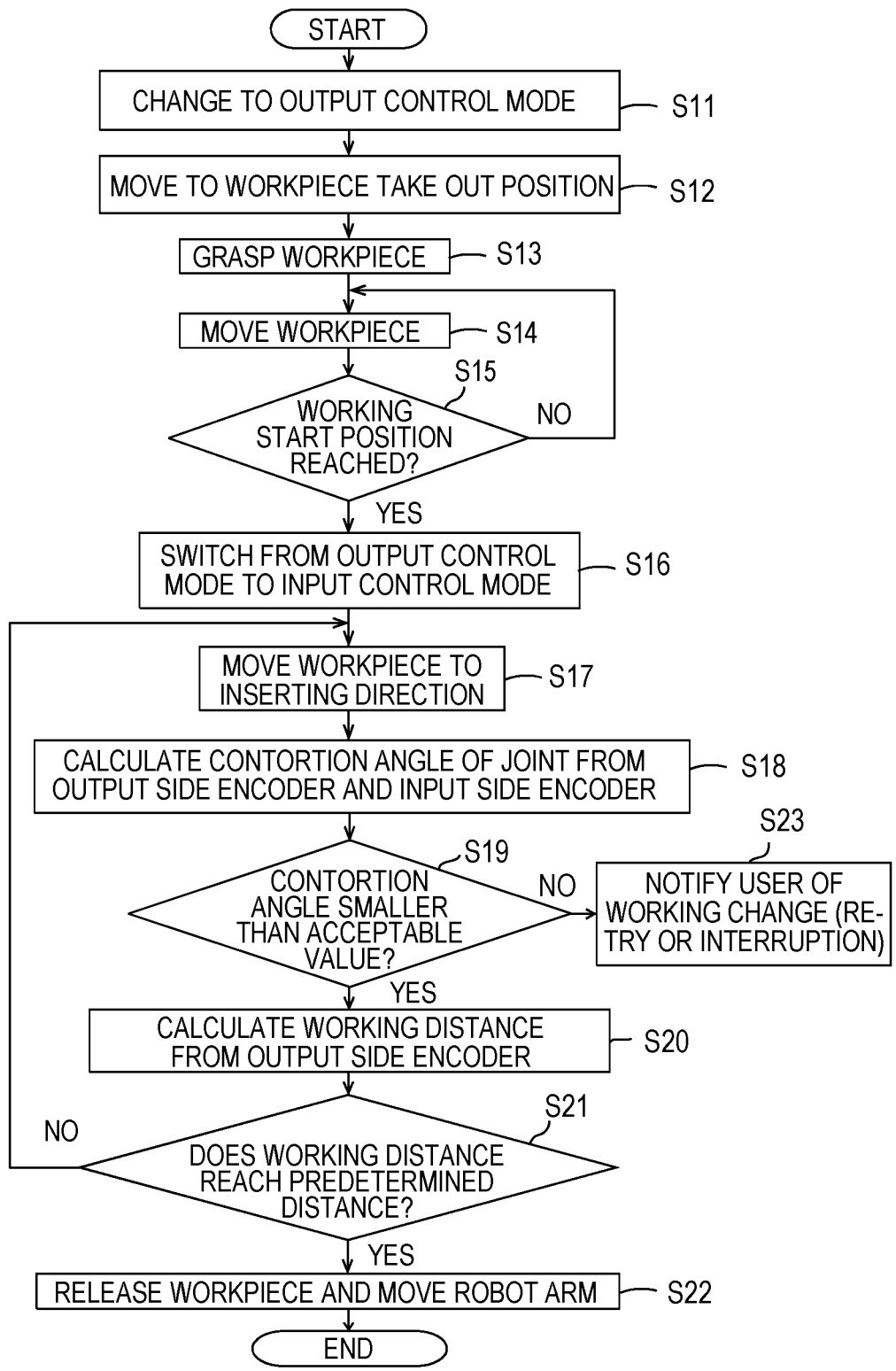
FIG. 8 is a flowchart illustrating a robot controlling method according to the second embodiment.

FIG. 8 is a flowchart illustrating a robot controlling method according to the second embodiment. In the second embodiment, as in the first embodiment, the CPU 301 performs respective steps of the robot controlling method based on a program 320.

Steps S11 to S17 and S22 illustrated in FIG. 8 are similar to steps S1 to S7 and S9 in FIG. 5 described in the first embodiment, and thus, description thereof will be omitted.

When the CPU 301, which functions as the workpiece work determination unit 334, as described above, makes a robot 200 perform insertion work, the CPU 301 calculates a contortion angle of a joint based on an angle detection value from the input side encoder 235 and an angle detection value from an output side encoder 236 (S18).

More specifically, where $\theta_{iN}$ is an angle detection value detected by the input side encoder 235, $\theta_{out}$ is an angle detection value detected by the output side encoder 236, N is a speed reducer ratio of a speed reducer 233 and $\Delta\theta$ is a contortion angle of a joint. A contortion angle of the joint can be calculated by $\Delta\theta = \theta_{out} - \theta_{iN}/N$, and the CPU 301 calculates a contortion angle $\Delta\theta$ of a joint using this expression. A contortion angle $\Delta\theta$ of a joint is calculated for each of the joints J1 to J6.

A joint, that is, the speed reducer 233 elastically deforms as a result of torque acting according to, e.g., a usage state of the robot hand 202 grasping a workpiece and weights of links. An angular displacement of a link 211 around the joint J2 relative to a link 212 as a result of elastic deformation of the speed reducer 233 is a contortion of the joint J2, and a contortion angle of the joint J2 is a displaced angle relative to an angle with no contortion. Therefore, calculating a contortion angle of the joint J2 is equal to calculating torque applied to the joint J2. The same applies to the other joints.

Therefore, the CPU 301 determines whether or not a calculated contortion angle Δθ is no more than an acceptable value, for each of the joints J1 to J6 (S19). The acceptable value is an acceptable contortion angle corresponding to acceptable torque that is acceptable for the relevant joint.

If each of the calculated contortion angles Δθ does not exceed the relevant preset acceptable value, that is, each of the calculated contortion angles Δθ is not more than the relevant acceptable value (S19: Yes), the CPU 301 continues the insertion work. In other words, if the contortion angle Δθ of each of the joints J1 to J6 is not more than the acceptable value, the CPU 301 continues the insertion work. Consequently, the joints can be prevented from being broken.

Then, if the CPU 301 performs an arithmetic operation to obtain a distance (work distance) of movement of the robot hand 202 from the working start position in an insertion direction in which the workpiece W1 is inserted to the workpiece W2, based on the angle detection values detected by the output side encoders 236 for the respective joints J1 to J6 (S20). Use of the angle detection values detected by the output side encoders 236 enables calculation of a correct work distance.

Next, the CPU 301 determines whether or not the work distance calculated in step S20 reaches the predetermined distance D (that is, whether or not the insertion work is completed) (S21).

If the insertion work is not yet completed (S21: No), the CPU 301 returns to step S17 and continues the insertion work.

If the CPU 301 determines that the insertion work is completed (S21: Yes), the CPU 301 moves fingers 220 of the robot hand 202 in respective directions in which the fingers 220 open (in other words, extends the robot hand 202) to release the workpiece W1. Then, the CPU 301 moves the robot arm 201 to a predetermined position and orientation (S22), and the present operation ends.

If any of the contortion angles Δθ exceeds the relevant acceptable value (S19: No), the CPU 301 makes a monitor 500 (see FIG. 3), which is a warning unit, display an image indicating that the contortion angle exceeds the acceptable value to warn a user (S23). Consequently, the user notices that the insertion work has failed.

In such case, the CPU 301 stops (or cancels or interrupts) the insertion work, more specifically, interrupts the work. Alternatively, the CPU 301 moves the robot hand 202 to the working start position again to make the robot 200 perform the insertion work (retry). Consequently, the joints J1 to J6 can be prevented from excessive load being imposed thereon. In other words, the joints J1 to J6 can be prevented from being broken, that is, the joints J1 to J6 can be protected from excessive load.

Also, there may be cases where a workpiece W1 is stuck and thus not completely inserted in the workpiece W2. Contortion angles of the joints J1 to J6 in such cases are empirically obtained in advance and such contortion angles are set as the acceptable values, enabling detection of the workpiece W1 being stuck during insertion, from the contortion angles Δθ. In other words, a function of the CPU 301 that compares a contortion angle Δθ of each joint with an acceptable value serves as a detection unit for detecting that a workpiece W1 is stuck.

As described above, when insertion work for moving the robot hand 202 from a working start position by a predetermined distance D in an insertion direction is performed, the second embodiment ensures mechanical compliance of the robot arm 201. Accordingly, the robot 200 can smoothly perform insertion work for inserting a workpiece W1 to a workpiece W2, enhancing the workability in the insertion work.

Third Embodiment

Next, a robot controlling method for a robot apparatus according to a third embodiment of the present invention will be described. The third embodiment will be described in terms of a case where a workpiece W1 is made to abut to an abutment surface of a workpiece W2 to complete insertion work.

Figure 9A:
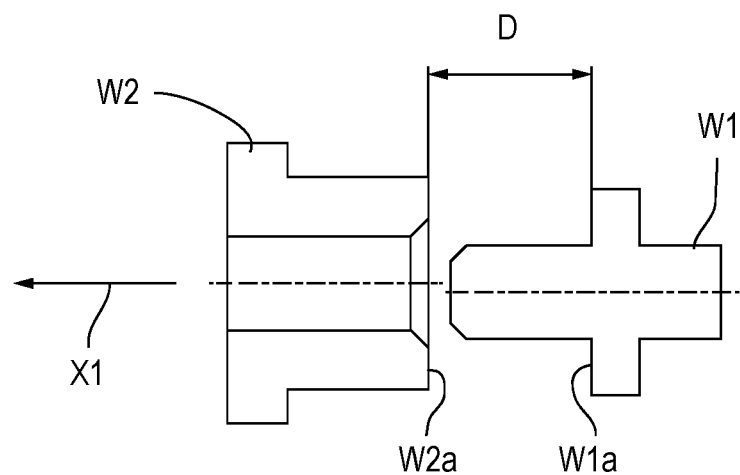
FIGS. 9A and 9B are diagrams illustrating states before and after insertion work for inserting a first workpiece to a second workpiece.
Figure 9B:
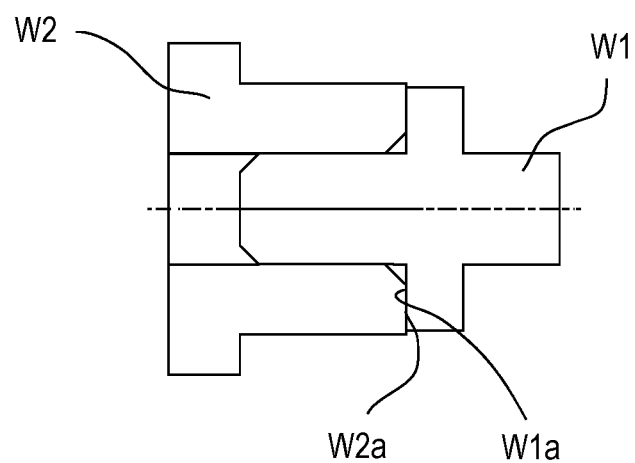

FIGS. 9A and 9B are diagrams illustrating states before and after insertion work for inserting a workpiece W1 to a workpiece W2. FIG. 9A illustrates a state before insertion work and FIG. 9B illustrates a state after the insertion work. The workpiece W1 is a member including a columnar body part with a radially-extending flange formed thereon, and the workpiece W2 is a member with a through hole formed therein, the through hole allowing the body part of the workpiece W1 to be fitted therein. When a robot hand 202 moves to a working start position, the workpiece W1 grasped by the robot hand 202 moves to the position in FIG. 9A. As a result of moving the robot hand 202 from the working start position in an insertion direction (arrow X1 direction), as illustrated in FIG. 9B, an abutment surface W1$a$ of the flange of the workpiece W1 abuts to an abutment surface W2$a$ of the workpiece W2, whereby the insertion work is completed.

Figure 10:
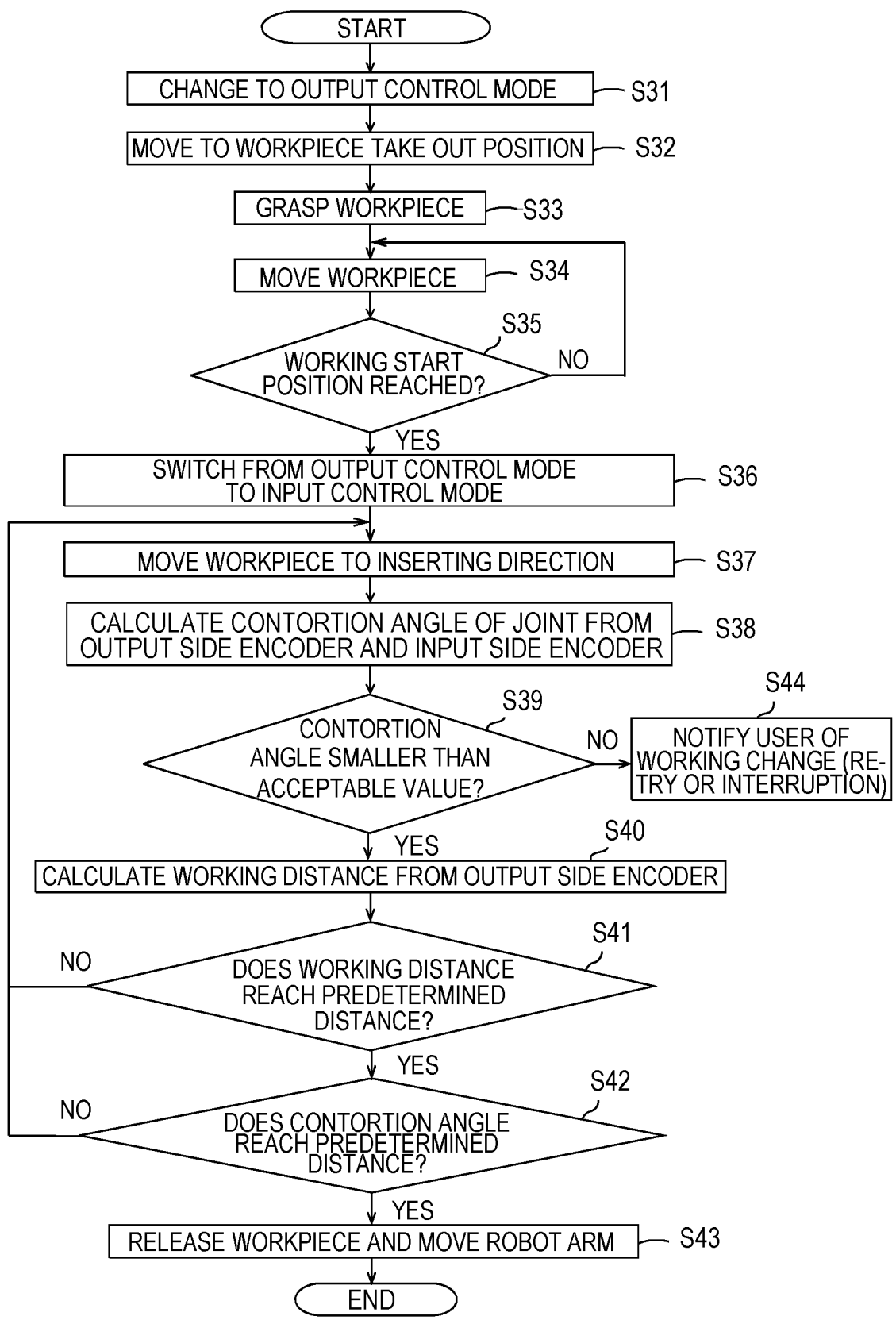
FIG. 10 is a flowchart illustrating a robot controlling method according to a third embodiment.

FIG. 10 is a flowchart illustrating the robot controlling method according to the third embodiment. The third embodiment is substantially similar to the first and second embodiments described above in apparatus configuration of the robot apparatus and is different from the first and second embodiments in control operation of a CPU, which is a controlling unit, that is, a program that makes the CPU operate. Therefore, description of components and configurations in the third embodiment that are similar to those of the first and second embodiments will be omitted and description of differences from the first and second embodiments will be provided.

In the third embodiment, also, as in the first and second embodiments, the CPU 301 performs respective steps of the robot controlling method based on a program 320. Steps S31 to S37 illustrated in FIG. 10 are similar to steps S1 to S7 in FIG. 5, which have been described in the first embodiment, and steps S38 to S41 and S44 are similar to steps S18 to S21 and S23, which have been described in the second embodiment, and thus, description thereof will be omitted.

If the CPU 301 determines in step S41 that the work distance reaches the predetermined distance D (S41: Yes), the CPU 301 determines whether or not the contortion angles Δθ of the respective joints J1 to J6 reach respective predetermined values (S42).

Here, there is a predetermined margin of a position (insertion position) in the predetermined distance D from the working start position in the insertion direction due to, e.g., a tolerance of the workpiece W1 or the workpiece W2. Therefore, if the CPU 301 determines that the insertion position is reached (S41: Yes), the CPU 301 proceeds to processing in next step S42.

If any of the contortion angles Δθ is equal to or below the relevant predetermined value (S42: No), the CPU 301 returns to step S37 and continues the insertion work.

If the contortion angles Δθ reach the respective predetermined values (S42: Yes), the CPU 301 moves fingers 220 of the robot hand 202 in respective directions in which the fingers 220 open (that is, extends the robot hand 202) to release the workpiece W1. Then, the CPU 301 moves the robot arm 201 to a predetermined position and orientation (S43), whereby the insertion work is completed. In such case where insertion is completed by making the workpiece W1 abut to the workpiece W2, it can be determined that the insertion work is completed if a work distance of the workpiece W1 calculated from the angle detection values detected by the output side encoders 236 and the joint contortion angles fall within respective predetermined position ranges.

According to the third embodiment, addition of the processing in step S42 to the processing in the CPU in the second embodiment described above makes contortion amounts of the respective joints J1 to J6 of the robot arm 201 constant, resulting in application of constant torque to the workpiece W1. As a result of the application of constant torque to the workpiece W1 ensures reliable insertion work and achieves stable assembly work.

Also, in the third embodiment, as in the first and second embodiments, proper switching between an output based control mode and an input based control mode ensures a positioning accuracy of positioning to a working start position and mechanical compliance during insertion operation.

Fourth Embodiment

Next, a robot controlling method in a robot apparatus according to a fourth embodiment of the present invention will be described. The fourth embodiment relates to a robot controlling method in work for extracting a workpiece W1 from a workpiece W2.

Figure 11A:
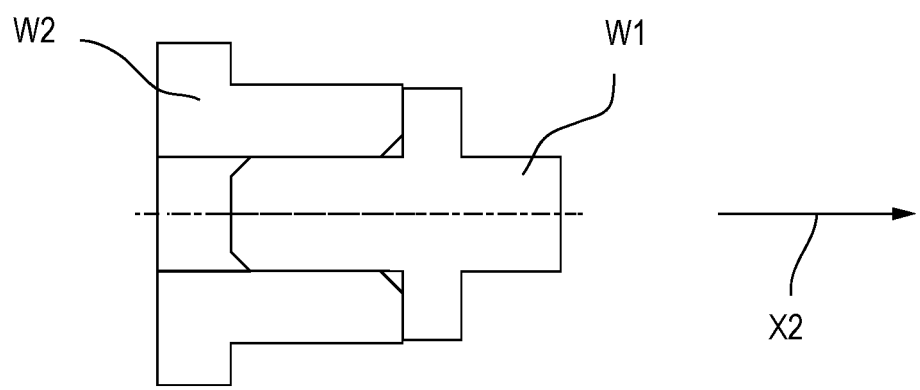
FIGS. 11A and 11B are diagrams illustrating states before and after extracting working for extracting a first workpiece from a second workpiece.
Figure 11B:
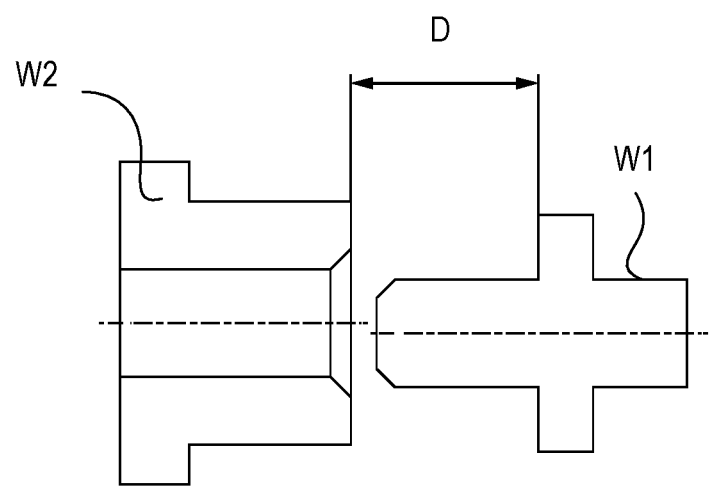

FIGS. 11A and 11B are diagrams illustrating states before and after extracting working for extracting a workpiece W1 from a workpiece W2. FIG. 11A illustrates a state before extracting working, and FIG. 11B illustrates a state after the extracting working. The workpiece W1 is a member including a columnar body part with a radially-extending flange formed thereon, and the workpiece W2 is a member with a through hole formed therein, the through hole allowing the body part of the workpiece W1 to be fitted therein.

FIG. 11A indicates a position of the workpiece W1 when the robot hand 202 has been moved to a working start position and grasped the workpiece W1. FIG. 11B indicates a position of the workpiece W1 when the robot hand 202 has been moved by a predetermined distance D from a working start position in an extraction direction in which the workpiece W1 is extracted from the workpiece W2 (arrow X2 direction). Here, the workpiece W2 is fixed at a predetermined position via a non-illustrated fixture so as not to move together with the workpiece W1 as a result of extracting working for extracting the workpiece W1.

Figure 12:
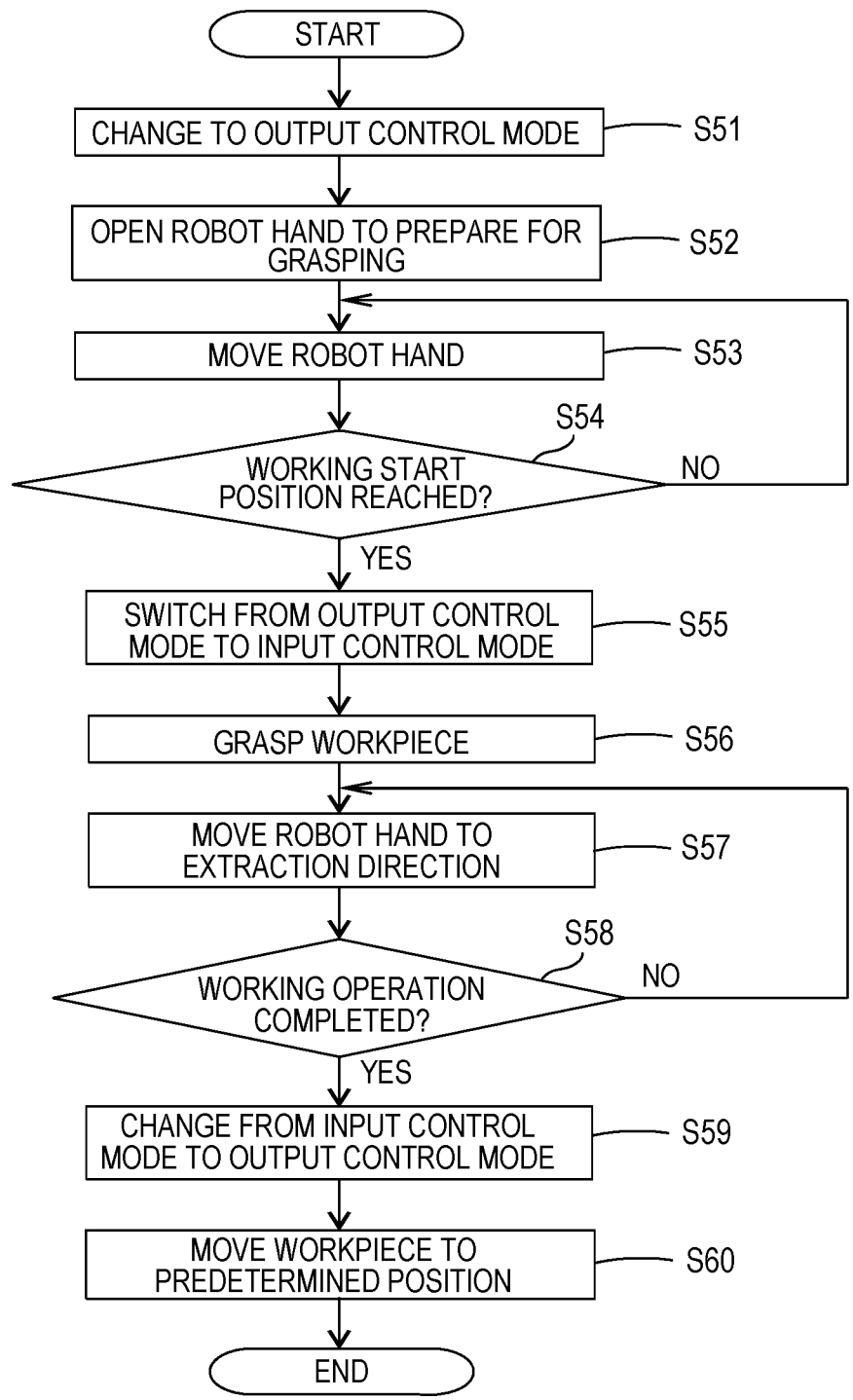
FIG. 12 is a flowchart illustrating a robot controlling method according to a fourth embodiment.

FIG. 12 is a flowchart illustrating the robot controlling method according to the fourth embodiment. The configuration of the robot apparatus in the fourth embodiment is substantially similar to those of the first to third embodiments, but is different from the first to third embodiments in control operation of a CPU, which is a controlling unit, that is, a program that makes the CPU operate. Accordingly, description of components and configurations in the fourth embodiment that are similar to those of the first to third embodiments will be omitted and description of differences from the first to third embodiments will be provided.

In the fourth embodiment, as in the first to third embodiments, a CPU 301 performs respective steps of a robot controlling method based on a program 320. In the fourth embodiment, predetermined work to be performed by a robot 200 is extracting working for extracting a workpiece W1 from a workpiece W2.

The CPU 301 changes control of a robot arm 201 to an output based control mode (S51).

Next, the CPU 301 moves fingers 220 of the robot hand 202 in respective directions in which the fingers 220 open to prepare for grasping of the workpiece W1 in order to make the robot hand 202 grasp the workpiece W1 (S52).

Next, the CPU 301 controls operation of the robot arm 201 so as to position the robot hand 202 at a working start position at which extracting working for extracting the workpiece W1 via the robot 200 is started (S53: output control step). In this case, since the CPU 301 sets the control mode to the output based control mode, the robot hand 202 can be positioned at the working start position with high accuracy. The working start position is set in a position of the workpiece W1. Here, the operation in step S52 may be performed during operation of the robot arm 201 in step S53.

Next, the CPU 301 determines whether or not the robot hand 202 reaches the working start position (S54: determination step).

If the CPU 301 determines in step S54 that the robot hand 202 does not yet reach the working start position (S54: No), the CPU 301 returns to step S53 and controls the operation of the robot arm 201 in the output based control mode.

If the CPU 301 determines in step S54 that the robot hand 202 reaches the working start position (S54: Yes), the CPU 301 changes the setting for the control of the robot arm 201 from the output based control mode to an input based control mode (S55: input control step). Consequently, mechanical compliance of the robot arm 201 is ensured.

Next, the CPU 301 moves the fingers 220 of the robot hand 202 in respective directions in which the fingers 220 are closed to make the robot hand 202 grasp the workpiece W1 (S56). The processing in step S56 may be performed between step S54 and step S55.

Next, the CPU 301 controls the operation of the robot arm 201 so that the robot hand 202 grasping the workpiece W1 moves in a direction in which the robot hand 202 extracts the workpiece W1 from the workpiece W2 (S57).

In the input based control mode, the mechanical compliance is high, and during the extracting working, imposing excessive load on the workpieces or the robot arm 201 is suppressed, preventing problems such as a failure to extract the workpiece W1 or damage of the workpieces W1 and/or W2.

Next, the CPU 301 determines whether or not the extracting working is completed (S58: workpiece work determination step). If the extracting working is not yet completed (S58: No), the CPU 301 returns to step S57 and continues the extracting working.

If the CPU 301 determines that the extracting working is completed (S58: Yes), the CPU 301 changes the setting for the control of the robot arm 201 from the input based control mode to the output based control mode (S59). Next, the CPU 301 controls the operation of the robot arm 201 so as to move the workpiece W1 to a predetermined position (S60), and the workpiece W1 has been moved to the predetermined position and the CPU 301 ends the operation. In the fourth embodiment, the CPU 301 changes the setting to the output based control mode, and thus, the workpiece W1 is positioned at the predetermined position with high accuracy.

Although the control mode was changed to the output based control mode at the time of completion of the extracting working, the control mode may be kept in the input based control mode if there is no need to position the workpiece W1 with high accuracy or if there is no concern about an accuracy of an operation route during the movement. In other words, when transporting the workpiece W1, the control mode may be set to either the output based control mode or the input based control mode according to the positioning accuracy or the trajectory accuracy. Therefore, if the positioning accuracy or the trajectory accuracy needs to be high, the control mode may be set to the output based control mode.

As described above, according to the fourth embodiment, when positioning the robot hand 202 at a working start position, the control mode is set to the output based control mode, whereby the operation accuracy of the robot arm 201 is enhanced, enabling the robot hand 202 to be positioned at the working start position with high accuracy. Also, in extracting working, the control mode is set to the input based control mode, whereby mechanical compliance (flexibility) of the robot arm 201 is ensured and extracting working for the robot 200 extracting the workpiece W1 can be performed smoothly, enhancing the workability in the extracting working.

Fifth Embodiment

Next, a robot controlling method for a robot apparatus according to a fifth embodiment of the present invention will be described. The fifth embodiment will be described in terms of a robot controlling method in work for extracting a workpiece W1 from a workpiece W2.

Figure 13:
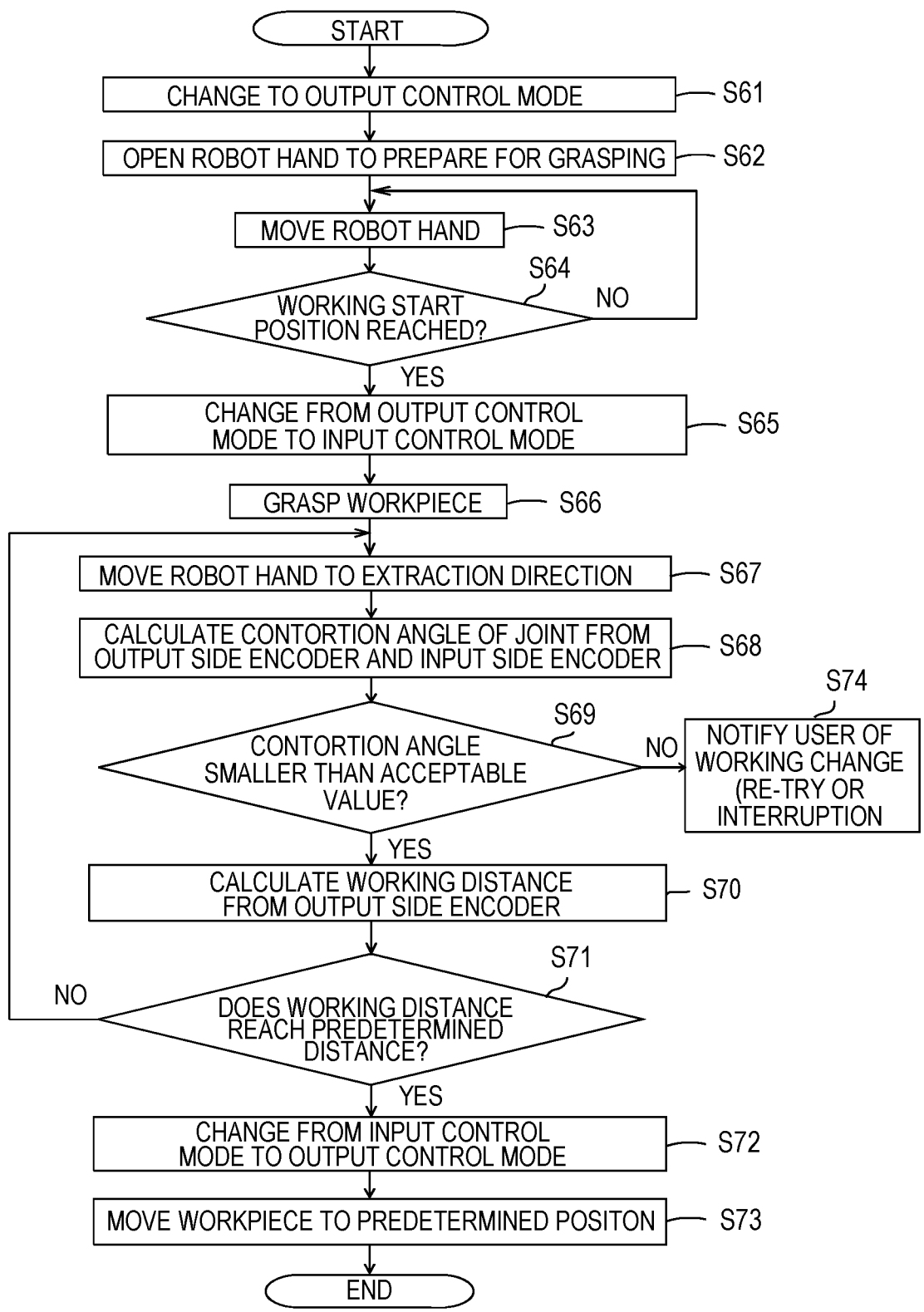
FIG. 13 is a flowchart illustrating a robot controlling method according to a fifth embodiment.

FIG. 13 is a flowchart illustrating a robot controlling method according to the fifth embodiment. The fifth embodiment is substantially similar to the first to fourth embodiments in terms of apparatus configuration of the robot apparatus but is different from the first to fourth embodiment in control operation of a CPU, which is a controlling unit, that is, a program that makes the CPU perform. Therefore, in the fifth embodiment, description of components and configurations that are similar to those of the first to fourth embodiments will be omitted and description of differences from the first to fourth embodiments will be provided.

In the fifth embodiment, as in the first to fourth embodiments above, a CPU 301 performs respective steps of the robot controlling method based on a program 320. In the fifth embodiment, as in the fourth embodiment, predetermined work to be performed by the robot 200 is extracting working for extracting a workpiece W1 from a workpiece W2.

Steps S61 to S67 in FIG. 13 are similar to steps S51 to S57 in FIG. 12, which have been described in the fourth embodiment, and thus description thereof will be omitted.

During the robot 200 being made to perform the extracting working in step S67, the CPU 301 calculates a contortion angle of each of joints J1 to J6, based on angle detection values of respective input side encoders 235 and angle detection values of respective output side encoders 236 (S68).

Next, the CPU 301 determines whether or not the calculated contortion angle is equal to or below an acceptable value, for each of the joints J1 to J6 (S69). The acceptable value is an acceptable contortion angle corresponding to acceptable torque that is acceptable for the relevant joint.

If each of the calculated contortion angles does not exceed the relevant preset acceptable value, that is, is equal to or below the relevant acceptable value (S69: Yes), the CPU 301 continues the extracting working. In other words, if the contortion angle of each of the joints J1 to J6 is equal to or below the relevant acceptable value, the CPU 301 continuous the extracting working. Consequently, the joints can be prevented from being broken.

Then, the CPU 301 performs an arithmetic operation to obtain a distance of movement of the robot hand 202 from a working start position in a direction in which the workpiece W1 is extracted from the workpiece W2 (work distance), based on the angle detection values detected by the output side encoders 236 for the respective joints J1 to J6 (S70).

Next, the CPU 301 determine whether or not the work distance calculated in step S70 reaches a predetermined distance D (that is, the extracting working is completed) (S71).

If the extracting working is not yet completed (S71: No), the CPU 301 returns to step S67 and continues the extracting working.

If the CPU 301 determines that the extracting working is completed (S71: Yes), the CPU 301 changes the setting for the control of the robot arm 201 from an input based control mode to an output based control mode (S72). Next, the CPU 301 controls operation of the robot arm 201 so as to move the workpiece W1 to a predetermined position (S73), and ends the operation when the workpiece W1 is moved to the predetermined position.

If any of the contortion angles exceeds the relevant acceptable value (S69: No), the CPU 301 makes a monitor 500 (see FIG. 3), which is a warning unit, display an image indicating that the contortion angle exceeds the acceptable value to warn a user (S74). Consequently, the user notices that the extracting working for extracting the workpiece W1 has failed.

In such case, the CPU 301 stops (or cancels or interrupts) the extracting working, more specifically, interrupts the extracting working. Alternatively, the CPU 301 moves the robot hand 202 to the working start position again to make the robot 200 perform the extracting working (retry). Consequently, the joints J1 to J6 are prevented from excessive load being imposed thereon. In other words, the joints J1 to J6 can be prevented from being broken, that is, the joints J1 to J6 can be protected from excessive load. Furthermore, in step S70, use of the angle detection values from the output side encoders 236 enables calculation of a correct extracting working distance.

Also, proper switching between the output based control mode and the input based control mode ensure an accuracy of positioning to a working start position and mechanical compliance during extracting working.

Sixth Embodiment

Next, a robot controlling method for a robot apparatus according to a sixth embodiment of the present invention will be described. In the sixth embodiment, a robot controlling method in insertion work for inserting a workpiece W1 to a workpiece W2 will be described.

Figure 14:
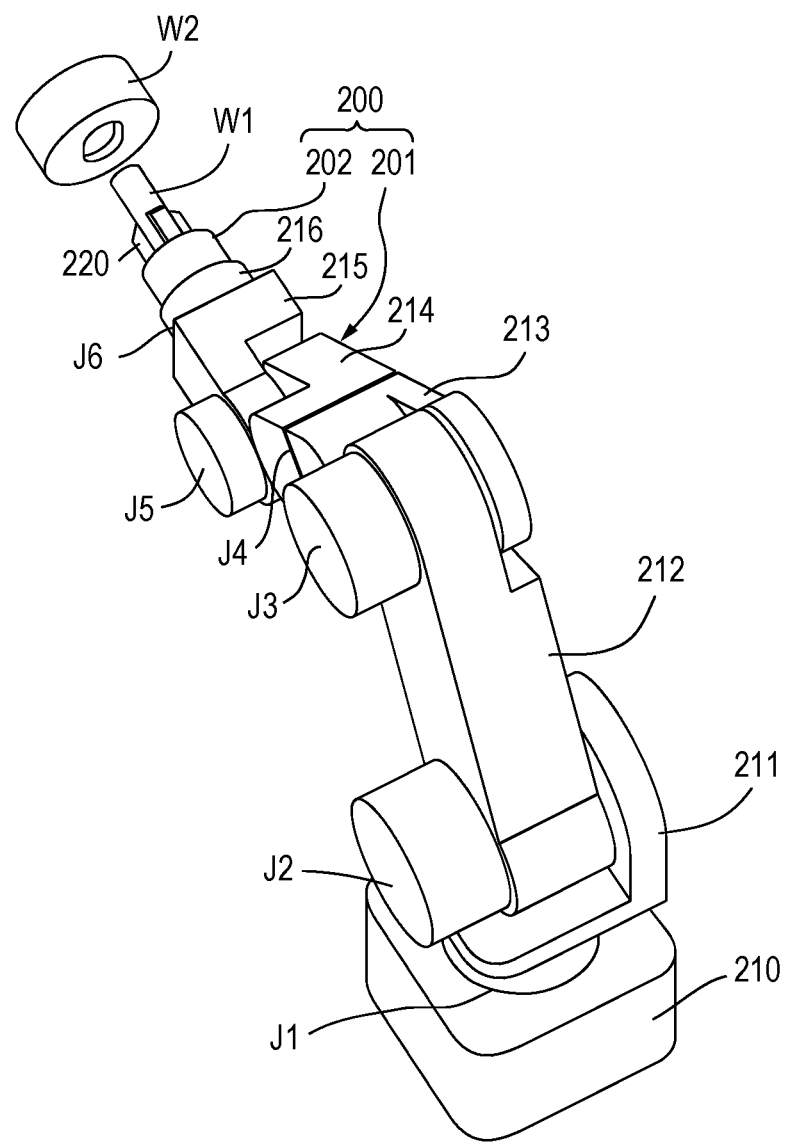
FIG. 14 is a diagram illustrating workpiece insertion work performed by a robot in a robot apparatus according to a sixth embodiment.

FIG. 14 is a diagram illustrating workpiece insertion work performed by a robot in a robot apparatus according to the sixth embodiment. In the sixth embodiment, components that are similar to those of the first to fifth embodiments are provided with reference numerals that are the same as those of the first to fifth embodiments, and description thereof will be omitted. As illustrated in FIG. 14, a through hole that allows a workpiece W1 to be inserted therein is formed in a workpiece W2, and the robot 200 inserts the workpiece W1 having a columnar shape to the through hole having an elongated shape in the workpiece W2.

Figure 15:
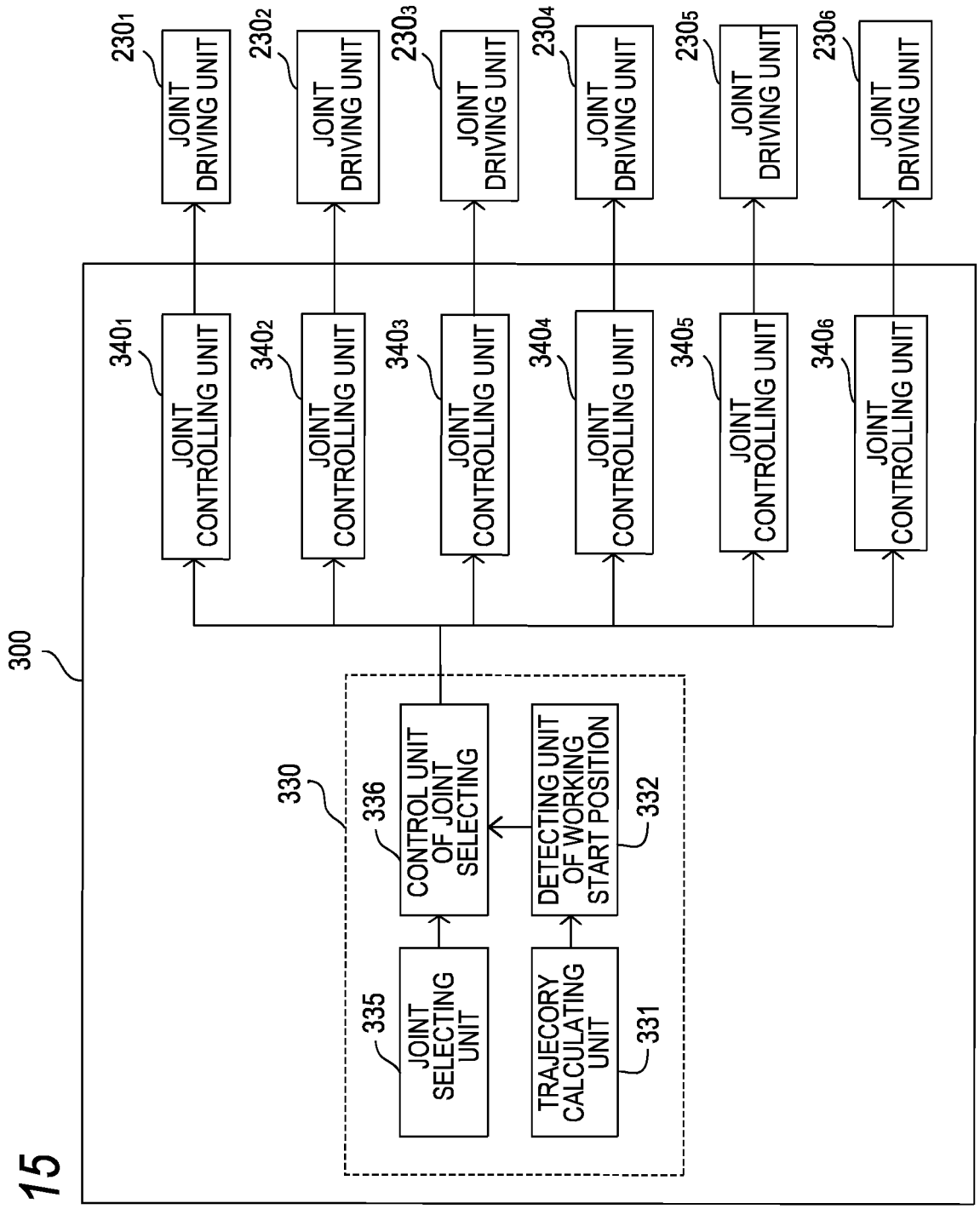
FIG. 15 is a functional block diagram illustrating a configuration of a main part of the robot apparatus according to the sixth embodiment.

FIG. 15 is a function block diagram illustrating a configuration of a main part of the robot apparatus according to the sixth embodiment. In the controller 300, functions of a CPU 301 based on a program 320 are illustrated in blocks.

At respective joints J1 to J6, joint driving units $230_1$ to $230_6$ that drive the respective joints are disposed. The controller 300 has functions of a main controlling unit 330 and joint controlling units $340_1$ to $340_6$ for the respective joints J1 to J6, each of the joint controlling units $340_1$ to $340_6$ being similar to the joint controlling unit 340.

The main controlling unit 330 includes a joint selecting unit 335 and a joint switching controlling unit 336 in addition to a trajectory calculating unit 331 and a working start position detecting unit 332.

The joint selecting unit 335 selects an input based control mode or an output based control mode for each of the joint driving units $230_1$ to $230_6$ in the joints J1 to J6 according to assembly work.

The joint switching controlling unit 336 selectively switches between the input based control mode and the output based control mode for each of the joints J1 to J6 (for each of the joint driving units $230_1$ to $230_6$) according to a result of the selection by the joint selecting unit 335.

The trajectory calculating unit 331 calculates a control instruction value for a joint for each operation of the robot arm 201. The working start position detecting unit 332 performs an arithmetic operation to obtain joint positions for which mode switching is performed, based on the trajectory calculating unit 331.

Figure 16:
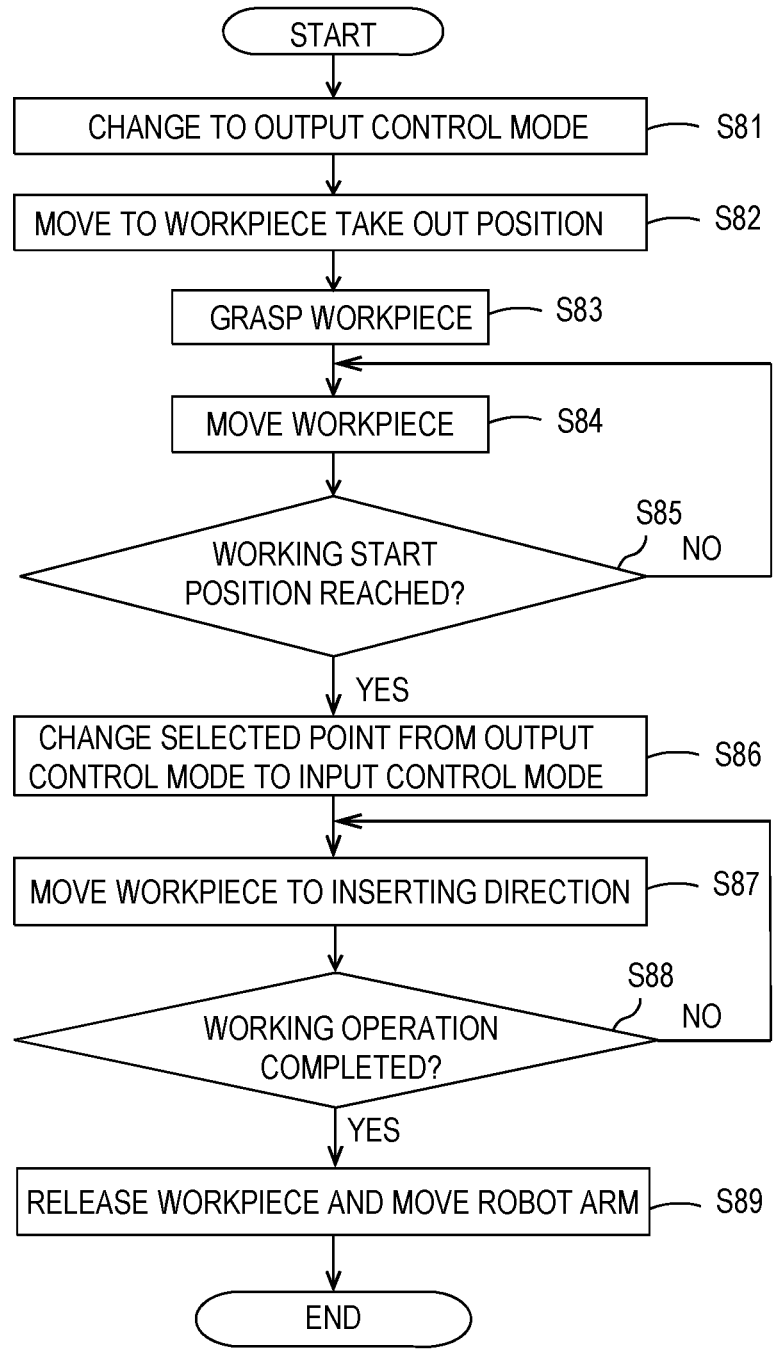
FIG. 16 is a flowchart illustrating a robot controlling method according to a sixth embodiment.

FIG. 16 is a flowchart illustrating a robot controlling method according to the sixth embodiment. The sixth embodiment is different from the first to fifth embodiments in control operation of a CPU, which is a controlling unit, that is, a program that makes the CPU operate.

Steps S81 to S85 and S87 to S89 in FIG. 16 are similar to steps S1 to S5 and S7 to S9 in FIG. 5, which have been described in the first embodiment, and thus description thereof will be omitted, and processing in step S86 will be described below.

In step S86, the CPU 301 switches the control mode from the output based control mode to the input based control mode on a joint-by-joint basis, according to the position and orientation and/or the working start position of the robot arm 201. In other words, when the robot 200 performs insertion work, the CPU 301 selects at least one joint driving unit from among the plurality of joint driving units $230_1$ to $230_6$, and changes the setting to the input based control mode for the selected joint driving unit. For example, in the state of the workpiece W2 and the robot arm 201 in FIG. 14, there is a large gap in a perpendicular direction therebetween, and thus, no mechanical compliance is needed in the perpendicular direction. Also, a gap in a horizontal direction is small, and thus, mechanical compliance is needed. The joints requiring no mechanical compliance are the joints J2, J3, J5 and J6, and the joint driving units $230_2$, $230_3$, $230_5$ and $230_6$ for these joints are controlled in the output based control mode. The remaining joints J1 and J4 require mechanical compliance, and thus the joint driving units $230_1$ and $230_4$ are controlled in the input based control mode. As described above, joints for which the control mode is to be switched is selected according to the necessity of mechanical compliance depending on the direction.

Therefore, in this example, in step S86, the CPU 301 selects the joint driving units $230_1$ and $230_4$, and changes the setting for the control mode to the input based control mode for the selected joint driving units $230_1$ and $230_4$.

Ensuring mechanical compliance is substantially equal to decrease in rigidity of the relevant joint, resulting in the joint becoming susceptible to shaking, its own weight and external forces from wiring and/or piping.

In the sixth embodiment, the control mode is changed to the input based control mode for minimum necessary joints J1 and J4 and the control mode is kept in the output based control mode for the other joints J2, J3, J5 and J6. Consequently, more stable work can be performed compared to the first to fifth embodiments.

Seventh Embodiment

Next, a robot controlling method for a robot apparatus according to a seventh embodiment of the present invention will be described.

If a robot 200 is made to perform work, teaching work for a user to teach a controller 300 about a working start position at which the work is started, using a teaching pendant 400 is required. In the teaching work, the user operates the robot 200 via the teaching pendant 400 to perform work for, e.g., part insertion, and makes coordinates for the work be stored in the controller 300.

In the seventh embodiment, a method for reducing teaching time by switching between an input based control mode and an output based control mode will be described.

Figure 17:
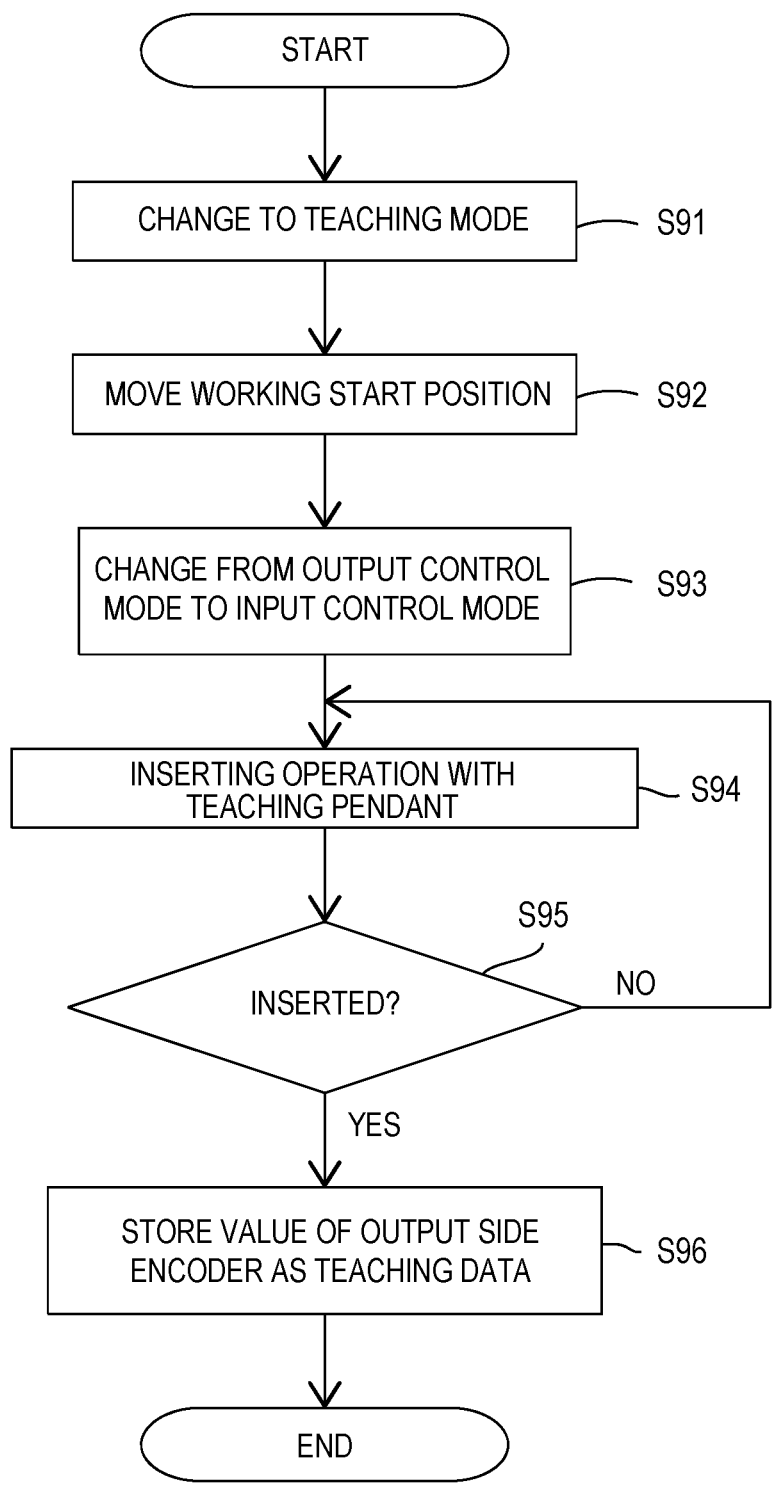
FIG. 17 is a flowchart illustrating a robot controlling method according to a seventh embodiment.

FIG. 17 is a flowchart illustrating a robot controlling method according to the seventh embodiment. The seventh embodiment is similar to the first to sixth embodiments in apparatus configuration of the robot apparatus, but is different from to the first to sixth embodiments in control operation of a CPU, which is a controlling unit, that is, a program that makes the CPU operate. Therefore, in the seventh embodiment, description of components and configurations that are similar to those of the first to sixth embodiments will be omitted and description of differences from the first to sixth embodiments will be provided.

First, the present operation is started, and the CPU 301 changes operation of the robot arm 201 to a teaching mode (S91). In the teaching mode, access to the robot 200 is transferred to a user and measures such as decreasing a speed of a robot arm 201 are conducted.

The CPU 301 controls the operation of the robot arm 201 so as to move a robot hand 202 to a working start position at which insertion of a workpiece W1 is started, in response to an instruction provided as a result of the user operating the teaching pendant 400 (S92). The movement method may be one based on a predetermined program or manual movement. Next, the CPU 301 changes the control mode from the output based control mode to the input based control mode (S93), whereby the mechanical compliance of the robot arm 201 is enhanced.

The CPU 301 controls the operation of the robot arm 201 according to the instruction provided as a result of the user operating the teaching pendant 400 to make the robot 200 perform the insertion work (S94).

Next, the CPU 301 determines whether or not a workpiece W1 is completely inserted in the workpiece W2 (S95). Normally, the determination is made visually by the user, and if the insertion work has failed, the CPU 301 returns to step S94 and repeats the work. If the CPU 301 confirms completion of the insertion in step S95, the CPU 301 proceeds to step S96.

In step S96, the CPU 301 stores data on angle detection values detected by output side encoders 236 (output angle detecting units) in a storage unit (for example, a HDD 304) as teaching data. Furthermore, in order to enhance the accuracy of the teaching data, it is possible that in the determination of completion of the insertion in step S95, joint contortion angles are referred to, and the operation is performed in step S94 so as to reduce the joint contortion angles. Also, the CPU 301 performs control to reduce the joint contortion angles to search for teaching positions, enabling work saving in teaching.

As described above, according to the seventh embodiment, the CPU 301, which serves as a controlling unit, changes the setting to an input based control mode in step when making the robot 200 performs insertion work according to an operation of the teaching pendant 400. Consequently, teaching time can be reduced while mechanical compliance during teaching is enhanced.

The present invention is not limited to the above-described embodiments, and many alterations are possible within the technical idea of the present invention.

Although the above embodiments have been described in terms of cases where each angle detector is a rotary encoder, the angle detectors are not limited to rotary encoders, and any one can be used as long as such one can detect a rotation angle of a respective shaft, and for example, a resolver can be used.

Also, although the above embodiments have been described in terms of cases where each speed reducer is a wave speed reducer, the speed reducers are not limited to wave speed reducers. The present invention can be applied as long as each speed reducer is a speed reducer whose output shaft is displaced by, e.g., elastic deformation when torque acts on the output shaft, other than wave speed reducers.

Also, although the above embodiments have been described in terms of cases where the robot arm is of a vertical, multi-joint type, the present invention is not limited to such cases, the present invention can be applied to cases where the robot arm is of a horizontal, multi-joint type.

Also, although the embodiments have been described in terms of cases where the end effector is a robot hand, the present invention is not limited to such cases, and the present invention can be applied even to cases where the end effector is a tool for working a workpiece.

Furthermore, although in the above embodiments, the output based control mode is set until the working start position is reached, it is possible that the control mode is switched from the input based control mode to the output based control mode at the working start position to perform positioning with high accuracy and the output based control mode is then switched to the input based control mode. Consequently, the speed of the robot arm 201 during operation can be enhanced.

Also, although the above embodiments have been described in terms of cases where a driving force of a rotating motor is directly transmitted to the speed reducer, the present invention is not limited to such cases and may be applied to cases where an indirect transmission unit is employed, for example, rotation of a rotation shaft of a rotating motor is transmitted to an input shaft of a speed reducer via a belt. In such cases, an input side encoder may be configured to detect a rotation angle of any of the rotation shaft of the rotating motor and the input shaft of the speed reducer.

Also, although the above embodiments have been described in terms of cases where the warning unit is the monitor 500, the present invention is not limited to such cases, a warning may be provided to a user by a sound output from a sound unit or light emission from a light emission unit.

Also, each processing operation in the above embodiments is performed specifically by the CPU 301. Therefore, each processing operation may be performed by supplying a recording medium that records a program providing the above-described functions to the controller 300 and making a computer (CPU or MPU) in the controller 300 read and execute the program stored in the recording medium. In this case, the program read from the recording medium itself provides the functions in the above-described embodiments, and the program itself and the recording medium recording the program fall within the scope of the present invention.

Also, although the above embodiments have been described in terms of cases where the computer-readable recording medium is the HDD 304 and the program 320 is stored in the HDD 304, the present invention is not limited to such cases. The program may be recorded in any type of recording medium as long as such recording medium is a computer-readable recording medium. For example, as a recording medium for supplying the program, e.g., the ROM 302 or the recording disk 321 illustrated in FIG. 3 or a non-illustrated external storage device may be used. As specific examples, for the recording medium, a flexible disk, a hard disk, an optical disk, a magneto-optical disk, a CD-ROM, a CD-R, a magnetic tape, a rewritable non-volatile memory (for example, a USB memory) or a ROM may be used.

Also, the program in each of the above embodiments may be downloaded via a network and executed by a computer.

Also, the present invention is not limited only to cases where the functions in the above-described embodiments are provided by executing program code read by a computer. The present invention includes cases where, an OS (operating system) operating on the computer based on an instruction from the program code partly or fully performs actual processing and such processing provides the functions in the above-described embodiments.

Furthermore, the program code read from the recording medium may be written in a memory included in a function extension board inserted in the computer or a function extension unit connected to the computer. The present invention includes cases where, e.g., a CPU included in the function extension board or the function extension unit partially or fully performs actual processing based on an instruction from the program code and such processing provides the functions in the above-described embodiment.

Also, although the above embodiments have been described in terms of cases where image processing is performed by a computer executing a program recorded in a recording medium such as an HDD, the present invention is not limited to such cases. A part or all of the functions in a controlling unit that operates based on the program may include a dedicated LSI such as an ASIC or an FPGA. Here, ASIC stands for application specific integrated circuit, and FPGA stands for field-programmable gate array.

According to the present invention, when positioning an end effector at a working start position, the control mode is set to an output based control mode, the accuracy in operation of a robot arm is enhanced, enabling the end effector to be positioned at the working start position with high accuracy. Also, during work, the control mode is set to an input based control mode, mechanical compliance of the robot arm is ensured and workability of the robot is thereby enhanced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2013-257609, filed Dec. 13, 2013, which is hereby incorporated by reference herein in its entirety.

What is claimed is:

1. A method of manufacturing a product using a robot for manufacturing the product, the robot having a joint, the joint having a rotating motor, a speed reducer transmitting a rotation of the rotating motor, a first angle sensor sensing a rotation angle of a rotation shaft of the rotating motor or an input shaft of the speed reducer, a second angle sensor sensing a rotation angle of an output shaft of the speed reducer; and a controller configured to control the joint,
wherein the method comprises:
performing a first controlling mode, by the controller, to acquire an output value of the first angle sensor and to operate the motor based on the output value of the first angle sensor for controlling the operation of the joint;
performing a second controlling mode, by the controller, to acquire an output value of the second angle sensor and to operate the motor based on the output value of the second angle sensor for controlling the operation of the joint; and
manufacturing the product by performing the first and second modes.

2. The method of manufacturing according to claim 1, wherein the robot arm has a plurality of the joints including a joint of which operation is controlled according to the first controlling mode, and a joint of which operation is controlled according to the second controlling mode.

3. The method of manufacturing according to claim 1, wherein the robot has an end effector, and
the method further comprises:
performing a contortion angle calculating to calculate, by the controller, a contortion angle of the joint, based on the output values of the first angle sensor and the second angle sensor,
wherein, during the contortion angle calculating, when the contortion angle exceeds an acceptable value, the controlling the operation of the joint according to the first controlling mode is stopped.

4. The method of manufacturing according to claim 3, wherein, during the contortion angle calculating, when the contortion angle exceeds an acceptable value, the controlling the operation of the joint according to the first controlling mode is stopped, and the operation of the joint is controlled according to the second controlling mode, the end effector is moved to a predetermined position.

5. The method of manufacturing according to claim 1, wherein the robot has an end effector, and
the method further comprising:
performing a contortion angle calculating to calculate, by the controller, a contortion angle of the joint, based on the output values of the first angle sensor and the second angle sensor,
wherein, during the contortion angle calculating, when the contortion angle exceeds an acceptable value, a notification is provided to a user.

6. The method of manufacturing according to claim 1, wherein the product is manufactured by contacting a first object to a second object,
the robot has an end effector grasping the first object, and
during the second controlling mode, under a condition of grasping the first object by the end effector, the first object is positioned at a predetermined position by the robot, and
during the first controlling mode, the first object contacts with the second object.

7. The method of manufacturing according to claim 6, wherein the end effector is a robot hand, and
a work to be performed during the first controlling mode is an inserting work to insert the first object into the second object.

8. The method of manufacturing according to claim 7, wherein the robot hand moves from a work start position in an inserting direction by a predetermined distance according to the first controlling mode by the controller, and then stops.

9. The method of manufacturing according to claim 8, wherein the method further comprises:
performing a contortion angle calculating to calculate, by the controller, a contortion angle of the joint, based on the output values of the first angle sensor and the second angle sensor,
wherein, when the robot hand moves from the work start position in the inserting direction, during the contortion angle calculating, when the contortion angle reaches an acceptable value, the inserting work is stopped.

10. The method of manufacturing according to claim 6, wherein the end effector is a robot hand grasping a first product, a work performed according to the first controlling mode is an extracting work to extract the first object from the second object.

11. The method of manufacturing according to claim 10, wherein the robot hand moves from a work start position in an extracting direction by a predetermined distance, and then stops according to the first controlling mode by the controller.

12. A robot comprising:
a joint having:
a rotating motor;

a speed reducer transmitting a rotation of the rotating motor;
a first angle sensor sensing a rotation angle of a rotation shaft of the rotating motor or an input shaft of the speed reducer; and
a second angle sensor sensing a rotation angle of an output shaft of the speed reducer; and
a controller configured to control the joint,
wherein the controller:
performs a first controlling mode to acquire an output value of the first angle sensor and to operate the motor based on the output value of the first angle sensor for controlling the operation of the joint; and
performs a second controlling mode to acquire an output value of the second angle sensor and to operate the motor based on the output value of the second angle sensor for controlling the operation of the joint.

13. A robot according to claim 12,
wherein the robot further has an end effector configured to hold a first object, and
under a state that the first object is held by the end effector, the controller controls the robot to position the first object to a predetermined position according to the second controlling mode, and controls the robot to contact the first object to the second object according to the first controlling mode.

14. A robot according to claim 12, wherein the robot has a plurality of the joints including a joint of which operation is controlled according to the first controlling mode, and a joint of which operation is controlled according to the second controlling mode.

15. A robot according to claim 12, wherein the controller adaptively changes the first controlling mode and the second controlling mode of the rotating motor depending on an object to assemble or a work process.

16. A robot according to claim 12, wherein the controller controls the rotating motor based on a rotating condition of the input side of the speed reducer sensed by the first angle sensor in the first controlling mode and controls the rotating motor based on a rotating condition of the output side of the speed reducer in the second controlling mode.

17. A method of controlling a robot, the robot having:
a joint, wherein the joint has:
a rotating motor;
a speed reducer transmitting a rotation of the rotating motor;
a first angle sensor sensing a rotation angle of a rotation shaft of the rotating motor or an input shaft of the speed reducer; and
a second angle sensor sensing a rotation angle of an output shaft of the speed reducer; and
a controller configured to control the joint,
wherein the method comprises:
performing a first controlling mode, by the controller, to acquire a detection result of the first angle sensor and to operate the rotating motor based on an output value of the first angle sensor for controlling the operation of the joint; and
performing a second controlling mode, by the controller, to acquire a detection result of the second angle sensor and to operate the rotating motor based on an output value of the second angle sensor for controlling the operation of the joint.

18. The method of controlling a robot according to claim 17, wherein the robot further has an end effector grasping a first object, and
during the second controlling mode, under a condition of grasping the first object by the end effector, the first object is positioned at a predetermined position by the robot, and
during the first controlling mode, the first object contacts with a second object.

19. A non-transitory computer-readable recording medium storing a readable controlling program for operating a computer to execute the method of controlling the robot according to claim 17.

* * * * *